US012793377B2

(12) United States Patent
Amano et al.

(10) Patent No.: US 12,793,377 B2
(45) Date of Patent: Nov. 10, 2026

(54) TYPE DISCRIMINATION DEVICE, TYPE DISCRIMINATION METHOD, TYPE DISCRIMINATION PROGRAM, AND DRUG SORTING DEVICE

(71) Applicant: YUYAMA MFG. CO., LTD., Osaka (JP)

(72) Inventors: Hirokazu Amano, Osaka (JP); Tsuyoshi Abe, Osaka (JP); Naoki Kitamura, Osaka (JP)

(73) Assignee: YUYAMA MFG. CO., LTD., Osaka (JP)

( * ) Notice: Subject to any disclaimer, the term of this patent is extended or adjusted under 35 U.S.C. 154(b) by 637 days.

(21) Appl. No.: 18/248,689

(22) PCT Filed: Oct. 27, 2021

(86) PCT No.: PCT/JP2021/039574
§ 371 (c)(1),
(2) Date: Apr. 12, 2023

(87) PCT Pub. No.: WO2022/092130
PCT Pub. Date: May 5, 2022

(65) Prior Publication Data

US 2023/0394785 A1 Dec. 7, 2023

(30) Foreign Application Priority Data

Oct. 29, 2020 (JP) ................................ 2020-181712
Jun. 8, 2021 (JP) ................................ 2021-095967

(51) Int. Cl.
*G06V 10/44* (2022.01)
*G06T 7/11* (2017.01)
(Continued)

(52) U.S. Cl.
CPC ................ *G06V 10/44* (2022.01); *G06T 7/11* (2017.01); *G06T 7/149* (2017.01); *G06T 7/194* (2017.01);
(Continued)

(58) Field of Classification Search
CPC .... G06V 10/245; G06V 10/44; G06V 10/774; G06V 20/66; G06V 2201/09;
(Continued)

(56) References Cited

U.S. PATENT DOCUMENTS

2007/0071285 A1* 3/2007 Kontsevich .......... G06V 10/757
382/103
2018/0260665 A1 9/2018 Zhang et al.
(Continued)

FOREIGN PATENT DOCUMENTS

CN 104321804 A * 1/2015 ............ G06V 20/66
CN 109961453 A 7/2019
(Continued)

OTHER PUBLICATIONS

Office Action in JP Application No. 2022-559184, mailed Jan. 16, 2024, 6pp.
(Continued)

*Primary Examiner* — Gregory A Morse
*Assistant Examiner* — Stefano Anthony Dardano
(74) *Attorney, Agent, or Firm* — HAUPTMAN HAM, LLP

(57) ABSTRACT

Evidence of a discrimination result of a drug can be presented, and various marks can be dealt with. A computer includes a feature extraction unit and a discrimination unit. The feature extraction unit generates an extraction mark image in which a mark appearing on a captured image is extracted, based on an output value obtained by inputting the captured image of a target drug whose type is unidentified to
(Continued)

a trained model constructed to extract the mark formed on the drug. The discrimination unit discriminates the type of the target drug, based on a collation result between the extraction mark image and a registration mark image registered in advance for each type of the drug.

8 Claims, 15 Drawing Sheets

(51) Int. Cl.
*G06T 7/13* (2017.01)
*G06T 7/149* (2017.01)
*G06T 7/194* (2017.01)

(52) U.S. Cl.
CPC ...... *G06T 7/13* (2017.01); *G06T 2207/20081* (2013.01)

(58) Field of Classification Search
CPC ... G06T 2207/20081; G06T 7/11; G06T 7/13; G06T 7/149; G06T 7/194
See application file for complete search history.

(56) References Cited

U.S. PATENT DOCUMENTS

| | | | | |
|---|---|---|---|---|
| 2019/0236614 | A1* | 8/2019 | Burgin | G06V 10/764 |
| 2020/0098135 | A1* | 3/2020 | Ganjineh | G01C 21/32 |
| 2020/0156120 | A1* | 5/2020 | Amano | A61J 3/00 |
| 2020/0320165 | A1* | 10/2020 | Srinivasan | G06V 30/414 |
| 2021/0019886 | A1* | 1/2021 | Iwami | G01N 21/9508 |
| 2021/0103766 | A1* | 4/2021 | Takamori | G06V 10/82 |
| 2021/0224590 | A1 | 7/2021 | Matsumoto et al. | |
| 2021/0312219 | A1 | 10/2021 | Iwami | |
| 2022/0130033 | A1* | 4/2022 | Rashidi | G01Q 30/04 |
| 2024/0112476 | A1* | 4/2024 | Haneda | G06F 16/583 |
| 2024/0212366 | A1* | 6/2024 | Haneda | G06V 30/248 |

FOREIGN PATENT DOCUMENTS

| | | | | |
|---|---|---|---|---|
| JP | 201615093 | A | 1/2016 | |
| JP | 2019212106 | A | 12/2019 | |
| JP | 202052627 | A | 4/2020 | |
| JP | 2020103885 | A | 7/2020 | |
| KR | 1020190133698 | A | 12/2019 | |
| WO | 2018190394 | A1 | 10/2018 | |
| WO | 2020105395 | A1 | 5/2020 | |
| WO | WO-2020162262 | A1 * | 8/2020 | G06V 20/10 |

OTHER PUBLICATIONS

Partial Supplementary European Search Report in EP Application No. 21886248.0, dated Jan. 16, 2024, 13pp.
International Search Report in PCT/JP2021/039574, mailed Jan. 18, 2022. 6pp.
Office Action in KR Application No. 10-2023-7009875, dated Sep. 10, 2024, 10pp.
Office Action in KR Application No. 10-2025-7024721, dated Oct. 14, 2025, 5pp.

* cited by examiner

TYPE DISCRIMINATION DEVICE, TYPE DISCRIMINATION METHOD, TYPE DISCRIMINATION PROGRAM, AND DRUG SORTING DEVICE

RELATED APPLICATIONS

The present application is National Phase of International Application Number PCT/JP2021/039574 filed Oct. 27, 2021, which claims priority of Japanese Application Nos. 2020-181712 filed Oct. 29, 2020 and 2021-095967 filed Jun. 8, 2021.

TECHNICAL FIELD

The present invention relates to a type discrimination device that discriminates a type of a drug by using a captured image of the drug. In addition, the present invention relates to a drug sorting device that sorts the drug for each type.

BACKGROUND ART

In the related art, a pharmacist or a doctor has manually sorted a plurality of types of returned drugs for each type. The returned drugs are post-dispensed drugs to be prescribed or prescribed to various patients.

Therefore, compared to dispensing business of collecting (packaging) (one or more) drugs (tablets) for each dosing period from a drug type group (drug cassette) preliminarily organized for each drug type in a dispensing device, based on prescription information per each patient, there are an extremely many types of drugs which are returned together after the drugs are prescribed to a plurality of patients. Therefore, it is highly useful to automatically sort and reuse the returned drugs.

In automatic sorting of the drugs, it is necessary to discriminate a type of the drug from a captured image of the drug, and one of major clues in this type discrimination is a mark formed on the drug. The mark includes both an engraved mark and a printed mark. In addition, various contents of the mark exist, and for example, the contents include graphics, symbols, letters, and numbers.

PTL 2 discloses a drug sorting device that realizes drug automatic sorting. The drug sorting device disclosed in PTL 2 captures images one by one from a plurality of types of drugs accommodated in a first accommodation unit, discriminates a type of the drug, based on the captured image, and sorts the drug into a second accommodation unit for each type, based on a discrimination result thereof.

CITATION LIST

Patent Literature

[PTL 1] JP-A-2020-052627
[PTL 2] Pamphlet of International Publication WO. 2018/190394

SUMMARY OF INVENTION

Technical Problem

It is difficult to highly accurately discriminate a type of the drug, based on the mark. The reason is as follows. As described above, various contents of the mark exist, and an appearance of the mark in the captured image is changed depending on how light illuminates the drug at the time of imaging.

Here, in the related art, an image processing technique using machine learning is known. For example, PTL 1 described above discloses a technique of using a trained model in a medical field, such as supporting case determination based on images. More specifically, PTL 1 discloses a verification system as follows. In accordance with an input of medical information to an input layer of the trained model, validity of a discrimination result output from an output layer of the trained model is determined, based on information on a calculation result stored in a storage unit and a calculation result output from an intermediate layer of the trained model. According to this verification system, the validity of the discrimination result can be verified.

When the trained model is applied to drug type discrimination, it can be expected to improve discrimination accuracy. However, when the trained model for discriminating a type of the drug is used, there is a problem in that it is difficult to present a validity for the discrimination result, in other words, it is difficult to present evidence of the discrimination result. For example, it is difficult to predict what kind of discrimination result will be output when an image of the drug which is not trained is input to the trained model for discriminating the type of the drug. When the discrimination result is incorrect, the evidence of the discrimination result is required at a medical site. However, it is difficult to present the evidence when the trained model as described above is used.

In addition, as described above, since various contents of the mark formed on the drugs exist, there is another problem in that a large amount of costs such as expenses, manpower, and time is required to construct the trained model in which all of the contents are trained.

An aspect of the present invention provides a type discrimination device that discriminates a type of a drug, and aims to realize a type discrimination device that can present evidence of a discrimination result and that can deal with various marks.

In addition, in the drug sorting device disclosed in PTL 2, the type number of the drugs to be accommodated in the first accommodation unit is not limited. On the other hand, the type number of the drugs which can be accommodated in the second accommodation unit is limited. Therefore, when the drugs whose number exceeds the type number of the drugs which can be accommodated in the second accommodation unit is accommodated in the first accommodation unit, some drugs cannot be accommodated in the second accommodation unit even when the types are discriminated. According to the drug sorting device disclosed in PTL 2, the drugs which cannot be accommodated in the second accommodation unit are caused to temporarily stand by for sorting to the second accommodation unit at a standby position (standby tray) different from the second accommodation unit.

In the drug sorting device disclosed in PTL 2, after all of the drugs accommodated in the first accommodation unit are conveyed to the second accommodation unit or the standby position, for example, the drugs in the second accommodation unit are packaged. In this manner, the drugs are removed from the second accommodation unit. Thereafter, the drug sorting device disclosed in PTL 2 discriminates again the types of the drugs on standby at the standby position, and accommodates the drugs in the second accommodation unit for each type. Here, when the drugs whose number exceeds the type number of the drugs which can be accommodated in the second accommodation unit are caused to stand by at the standby position, even when the types are discriminated, some drugs cannot be accommodated again in the second accommodation unit. In this case, the drug sorting device disclosed in PTL 2 causes the drugs to stand by again at the standby position (first accommodation unit or standby tray).

In this way, the drug sorting device disclosed in PTL 2 discriminates the types of the drugs until the drugs on standby at the standby position no longer exist when the drugs are caused to stand by at the standby position, and repeatedly performs an operation for accommodating the drugs in the second accommodation unit for each type, based on a discrimination result thereof.

Another aspect of the present invention aims to realize a drug sorting device which can reduce a processing time required when the drugs are caused to stand by at the standby position.

Solution to Problem

According to an aspect of the present invention, in order to solve the above-described problems, there is provided a type discrimination device including an image generation unit that generates an extraction mark image in which a mark appearing on a captured image of a target drug whose type is unidentified is extracted, based on an output value obtained by inputting the captured image to a trained model constructed to extract a mark formed on a drug, and a discrimination unit that discriminates the type of the target drug, based on a collation result between the extraction mark image generated by the image generation unit and a registration mark image registered in advance for each type of the drug.

According to an aspect of the present invention, in order to solve the above-described problems, there is provided a type discrimination method performed by a type discrimination device. The method includes an image generation step of generating an extraction mark image in which a mark appearing on a captured image of a target drug whose type is unidentified is extracted, based on an output value obtained by inputting the captured image to a trained model constructed to extract a mark formed on a drug, and a discrimination step of discriminating the type of the target drug, based on a collation result between the extraction mark image generated in the image generation step and a registration mark image registered in advance for each type of the drug.

According to an aspect of the present invention, in order to solve the above-described problems, there is provided a type discrimination program that causes a computer to execute an image generation step of generating an extraction mark image in which a mark appearing on a captured image of a target drug whose type is unidentified is extracted, based on an output value obtained by inputting the captured image to a trained model constructed to extract a mark formed on a drug, and a discrimination step of discriminating the type of the target drug, based on a collation result between the extraction mark image generated in the image generation step and a registration mark image registered in advance for each type of the drug.

According to an aspect of the present invention, in order to solve the above-described problems, there is provided a drug sorting device including a first accommodation unit having a plurality of first sections and configured to accommodate a plurality of types of drugs, a second accommodation unit having a plurality of second sections, each of which is configured to accommodate the drugs for each type, a reading unit that reads information indicating types of the drugs accommodated in the first accommodation unit, a counting unit that counts a type number of the drugs accommodated in the first accommodation unit, based on the information read by the reading unit, a notification unit that gives a notification to change the first section serving as an accommodation destination of the drugs, each time a total type number of the drugs counted by the counting unit reaches the number of the second sections, and a conveying unit that conveys the drugs accommodated in the first accommodation unit to the second accommodation unit for each of the first sections, and accommodates the drugs in the second accommodation unit for each type.

Advantageous Effects of Invention

According to a type discrimination device, a type discrimination method, and a type discrimination program in an aspect of the present invention, evidence of a discrimination result can be presented, and a type can be discriminated, based on various marks.

In addition, according to a drug sorting device in another aspect of the present invention, it is possible to reduce a processing time required when drugs are caused to stand by at a standby position.

DESCRIPTION OF EMBODIMENTS

Embodiment 1

[Outline of Drug Sorting Device 1]

Figure 1:
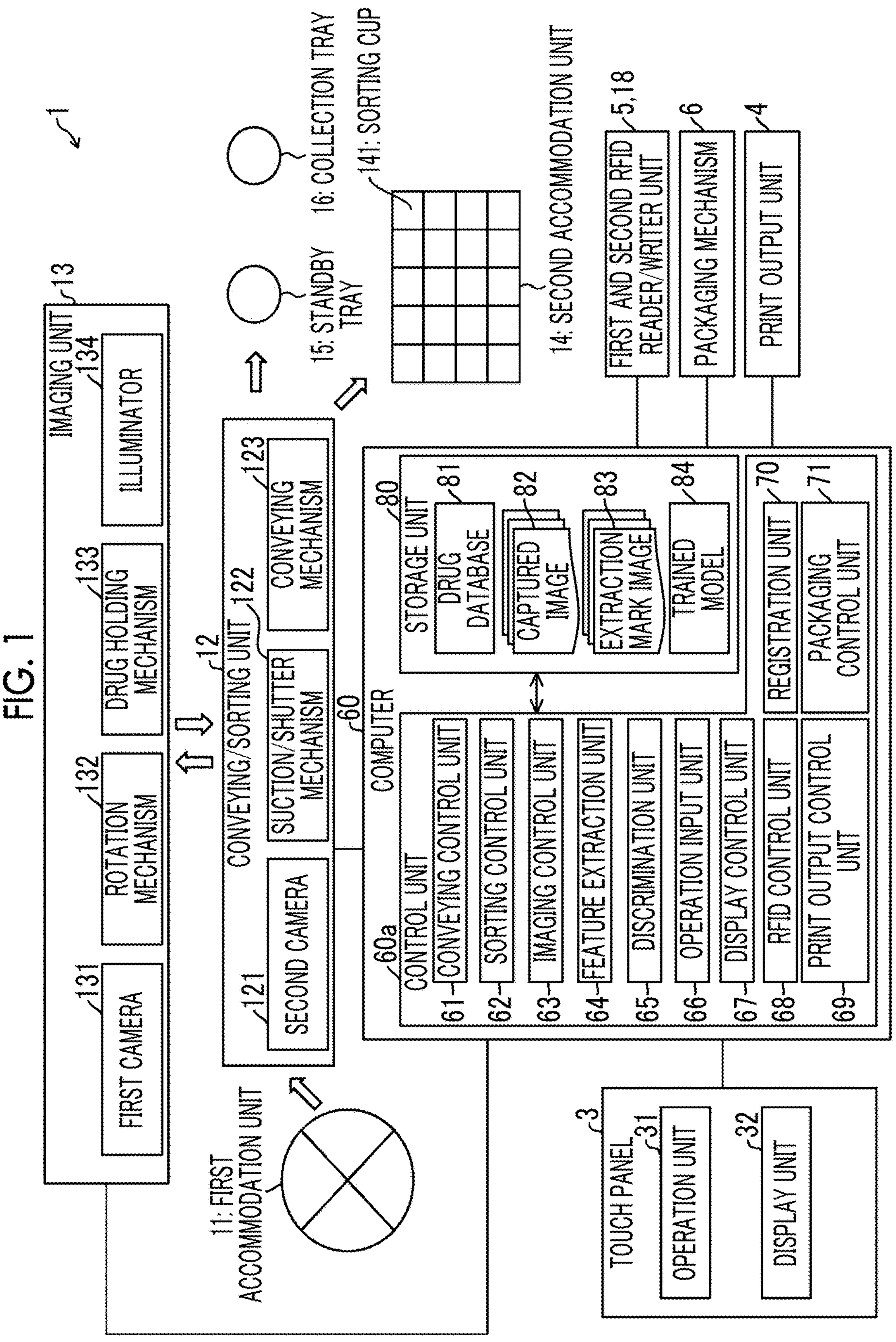
FIG. 1 is a block diagram illustrating an overall configuration of a drug sorting device.
Figure 2:
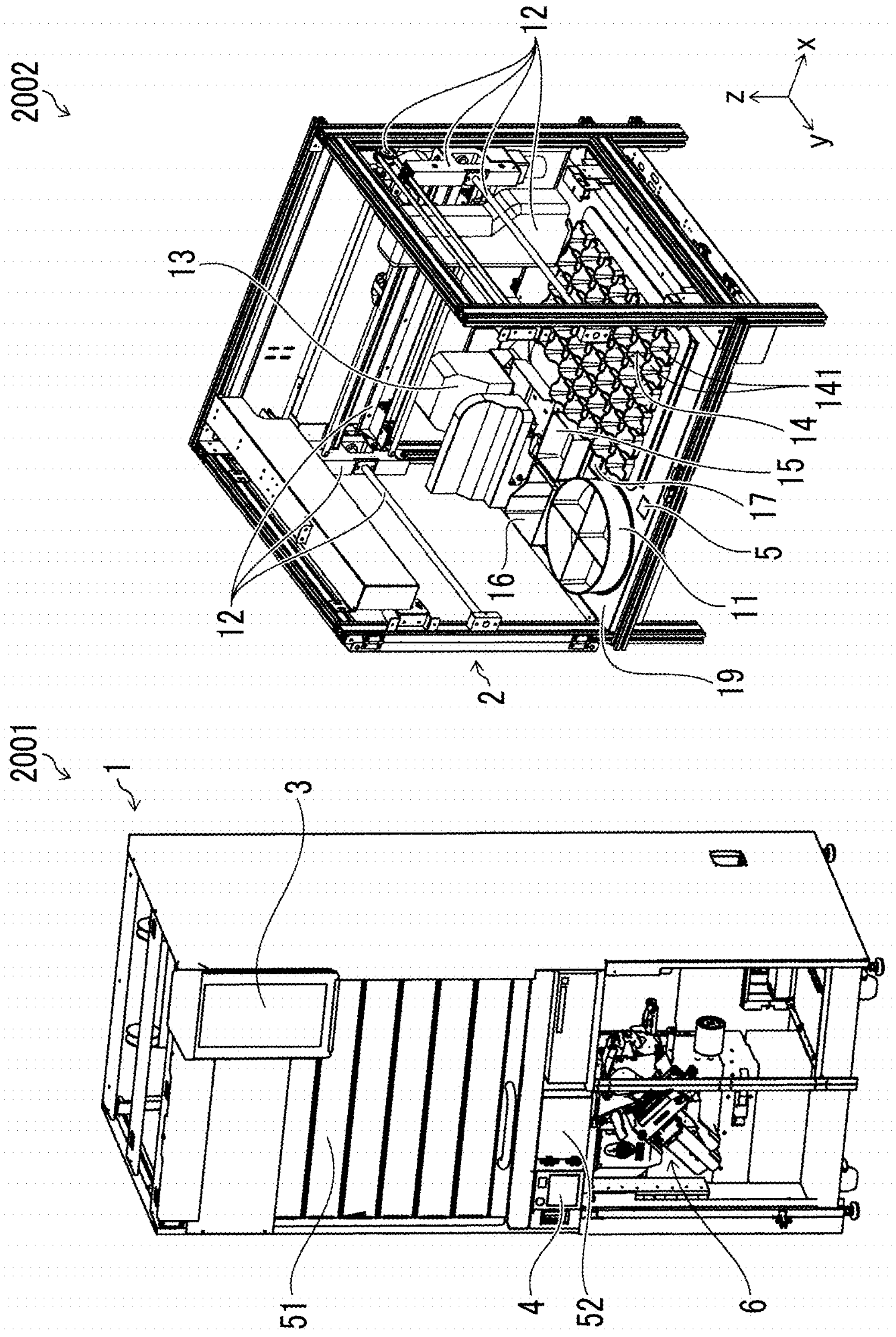
FIG. 2 is a view illustrating a configuration example of the drug sorting device.

First, an outline of a drug sorting device 1 will be described with reference to FIGS. 1 and 2. FIG. 1 is a block diagram illustrating an overall configuration of the drug sorting device 1. FIG. 2 is a view illustrating a configuration example of the drug sorting device 1, 2001 is a perspective view of the drug sorting device 1, and 2002 is a perspective view illustrating a basic configuration of a drug sorting region 2. As illustrated in FIGS. 1 and 2001 and 2002 in FIG. 2, the drug sorting device 1 includes the drug sorting region 2, a touch panel 3, a print output unit 4, and a packaging mechanism 6.

The drug sorting device 1 captures each image of a plurality of types of drugs, discriminates types of the drugs, based on an image obtained as an imaging result, and sorts the drugs for each type. Specifically, this processing is performed in the drug sorting region 2. The drug sorting region 2 (internal configuration of the drug sorting device 1) will be described later. The drugs sorted for each type are visually inspected by a user, and thereafter, are packaged or returned to a drug shelf or packaging machine.

In the present embodiment, the plurality of types of drugs are drugs which are not accommodated in a container, or drugs which are not packaged. As an example thereof, tablets or capsules will be described. In addition, description will be made on an assumption that the plurality of types of drugs are returned drugs. The drugs are drugs when adopted drugs at a pharmacy or a hospital are returned as "returned drugs" at the pharmacy or the hospital. However, in addition to the drugs adopted by the pharmacy or the hospital, the plurality of types of drugs may be "person's holding drugs" that may include drugs issued by other pharmacies or other hospitals. After the drugs are returned, the drug sorting device 1 can automatically perform processing from imaging to sorting.

The touch panel 3 receives various user inputs through an operation unit 31, and displays various images (for example, images illustrating changes in drug sorting or images for a visual inspection) through a display unit 32.

The print output unit 4 prints a journal indicating drug data (for example, data indicating a drug name, a manufacturer, or an ingredient) related to the drug after the visual inspection in accordance with a user input after the visual inspection. The drug data may include image data indicating a drug-specific image.

The packaging mechanism 6 packages sorted drugs. The packaging mechanism 6 is an optional mechanism. When the drug sorting device 1 includes the packaging mechanism 6, the drug sorting device 1 can collectively perform processing on the returned drugs from sorting to packaging after the visual inspection. In particular, when the drugs are fed into the packaging mechanism 6 by a conveying/sorting unit 12, the processing from sorting to packaging can be automatically performed except for the visual inspection.

As the packaging mechanism 6, it is possible to adopt a packaging unit of a tablet packaging machine or a powder drug packaging machine used in the related art. In this case, for example, the drugs inside the sorting cups 141 each sorted for the same type of the drugs can be packaged into one package or a plurality of packages.

It should be noted as follows. Throughout the specification of the present application, the term "packaging" used at least in the description of the drug sorting device 1 includes a meaning that "the drugs are separately packaged for each dosing time, based on prescription data" and a meaning that "the drugs sorted into the second accommodation unit 14 are simply packaged without any relation to the prescription data".

In addition, the drug sorting device 1 includes a first radio frequency identifier (RFID) reader/writer unit 5. The first RFID reader/writer unit 5 is provided on a drug fetching side of a base 19, as illustrated by 2002 in FIG. 2.

The first RFID reader/writer unit 5 reads data related to drugs accommodated in each sorting cup 141, which is stored in an RFID tag (not illustrated) provided in a bottom portion of each sorting cup 141 of the second accommodation unit 14. For example, the data includes data indicating the number of accommodated drugs, drug identification data (for example, a GS1 code) for identifying drugs, data indicating a type of the sorting cup 141, and sorting cup identification information (identification information assigned to the RFID tag) for identifying the sorting cup 141. Drug data (for example, drug names) of drugs accommodated in the sorting cup 141 and image data acquired by an imaging unit 13 are stored in a storage unit 80 in association with the sorting cup identification information.

In addition, the data may include drug data determined by the visual inspection (drug data after the visual inspection). In addition, the drug data after the visual inspection may be written in the RFID tag. The drug data after the visual inspection is used when the drugs accommodated in the corresponding sorting cup 141 are (1) packaged by the packaging mechanism 6 or a packaging machine different from the drug sorting device 1, or (2) are returned to the drug shelf. The drug data may be stored in the storage unit 80 in association with the sorting cup identification information.

In addition, as illustrated by 2001 in FIG. 2, the drug sorting device 1 includes an opening/closing shutter 51 and an opening/closing door 52 which can open and close the fetching side of the drugs.

[Basic Configuration of Drug Sorting Region 2]

Next, a basic configuration of the drug sorting region 2 (internal configuration of the drug sorting device 1) will be described with reference to 2002 in FIGS. 1 and 2.

As illustrated in 2002 in FIGS. 1 and 2, as hardware, the drug sorting region 2 mainly includes the first accommodation unit 11, a conveying/sorting unit 12 (sorting unit), the imaging unit 13, the second accommodation unit 14, a standby tray 15, a collection tray 16, a drug feeding port 17, and a second RFID reader/writer unit 18. Each member except for the conveying/sorting unit 12 is provided on the base 19. Main functions of the conveying/sorting unit 12, the imaging unit 13, and the second RFID reader/writer unit 18 will be described in detail in the description of each processing (to be described later).

The first accommodation unit 11 accommodates a plurality of types of drugs returned by a user in a mixed state. In the present embodiment, the first accommodation unit 11 is divided into a plurality of accommodation units. In this case, for example, when all of the drugs accommodated in one accommodation unit are conveyed by the conveying/sorting unit 12, the drugs accommodated in the other accommodation unit adjacent to the one accommodation unit are conveying targets. In addition, the first accommodation unit 11 may be provided to be pivotable around a Z-axis (center of a cylindrical shape). In this case, a control unit 60*a* of a computer 60 (type discrimination device) may cause the first accommodation unit 11 to pivot so that the conveying/sorting unit 12 can easily acquire the drug, for example, at a timing that one accommodation unit is empty.

The second accommodation unit 14 includes a plurality of the sorting cups 141 accommodating the drugs in a state where the drugs are sorted for each type. The control unit 60*a* discriminates a type of the drug, based on a drug image captured by the imaging unit 13, and determines the sorting cup 141 for accommodating the drug, based on a discrimination result thereof. The drug is conveyed and accommodated by the conveying/sorting unit 12 to the determined sorting cup 141.

The standby tray 15 is a temporary accommodation unit on which the drugs are temporarily placed. For example, when the drugs are accommodated in all of the sorting cups 141, the drugs discriminated to have a different type by the control unit 60*a* are temporarily placed on the standby tray 15. In this case, after the drugs are removed from the sorting cup 141, the drugs may be conveyed from the standby tray 15 to the sorting cup 141.

In addition, in the present embodiment, an estimated drug (to be described later) estimated to be a drug may be temporarily placed on the standby tray 15. When the estimated drug is temporarily placed, for example, the estimated drug is conveyed from the standby tray 15 to a predetermined region of the second accommodation unit 14 in accordance with the discrimination result of the control unit 60*a*.

The collection tray 16 is an accommodation unit for accommodating items (for example, foreign substances other than drugs) whose types cannot be discriminated by the control unit 60*a*. For example, the foreign substances other than drugs include fragments of a Press Through Pack (PTP) sheet. There is a possibility that the fragments of the PTP sheet may be mixed into the first accommodation unit 11 when the drug is returned. In addition, the control unit 60*a* causes the collection tray 16 to accommodate a drug registered in a drug database 81 as a drug to be discarded or a drug which a user desires to discard (for example, a drug whose manufacturing date is old).

The drug feeding port 17 is used for the conveying/sorting unit 12 to convey the drug accommodated in the second accommodation unit 14 to the packaging mechanism 6, when the drug sorting device 1 includes the packaging mechanism 6. As a matter of course, when the drug sorting device 1 does not include the packaging mechanism 6, the drug feeding port 17 is an unnecessary configuration.

In addition, as illustrated in FIG. 1, the computer is provided to control each of the above-described members (hardware) of the drug sorting device 1 in an integrated manner. The computer 60 includes the control unit 60*a* and the storage unit 80. The control unit 60*a* includes a conveying control unit 61, a sorting control unit 62, an imaging control unit 63, a feature extraction unit 64, a discrimination unit 65, an operation input unit 66, a display control unit 67, an RFID control unit 68, and a print output control unit 69, a registration unit 70, and a packaging control unit 71. Here, basic processing of the operation input unit 66, the display control unit 67, the RFID control unit 68, the print output control unit 69, and the packaging control unit 71 will be described. Basic processing of the conveying control unit 61, the sorting control unit 62, the imaging control unit 63, the feature extraction unit 64, and the discrimination unit 65 will be described in detail in the description of each processing (to be described later). Other processing will be described in each embodiment (to be described later).

The operation input unit 66 and the display control unit 67 each control the operation unit 31 and the display unit 32 of the touch panel 3. The RFID control unit 68 controls the first RFID reader/writer unit 5 and the second RFID reader/writer unit 18. The print output control unit 69 controls the print output unit 4 in accordance with a user input received by the operation input unit 66.

The registration unit 70 causes the drug database 81 to register drug data related to the drug for which the discrimination unit 65 determines that drug data corresponding to image data does not exist. Specifically, with regard to the drug for which the discrimination unit 65 determines that the drug data corresponding to the image data does not exist, the registration unit 70 associates a captured image 82 of the drug with the drug data specified by a user, and causes the drug database 81 to register the associated data.

When the drug sorting device 1 includes the packaging mechanism 6, the control unit 60*a* includes the packaging control unit 71 that controls the packaging mechanism 6. The packaging control unit 71 controls an operation of the packaging mechanism 6. In addition, the packaging control unit 71 controls the conveying/sorting unit 12 to convey the drug accommodated in the sorting cup 141 to the drug feeding port 17.

In addition, the drug sorting device 1 may include a barcode reader 7. For example, the barcode reader 7 reads a barcode indicating the drug data of the drug, which is printed on a drug package (packaging paper) in which the sorted drugs are packaged by the packaging mechanism 6. In this manner, the control unit 60*a* can perform processing based on the read barcode (for example, display of the drug data indicated by the barcode). The packaging mechanism 6 may include a barcode printing mechanism (not illustrated) that prints a barcode indicating the drug data of the drug packaged in the drug package on the drug package.

The barcode reader 7 may be any reading device which can read information indicating the drug data printed on the drug package. In addition, the drug sorting device 1 does not necessarily need to include the barcode reader 7. When the control unit 60*a* performs processing based on the above-described information, the control unit 60*a* may acquire the above-described information through communication with an external device including the barcode reader 7.

In addition, the computer 60 includes the storage unit 80. The storage unit 80 stores in advance a drug database (drug master) 81 for managing the drug data related to a plurality of types of drugs, and stores the captured image 82 as the drugs are sorted by the drug sorting device 1. The captured image 82 is an image captured by a first camera 131. Specifically, the captured image 82 is a captured image of a target drug whose type is unidentified, which is fetched from the first accommodation unit 11. In addition, the storage unit 80 stores an extraction mark image 83 generated by the feature extraction unit 64 and a trained model 84 used by the feature extraction unit 64 to generate the extraction mark image 83.

Various data stored in the storage unit 80 may not be managed by the storage unit 80, and may be managed by an external device, for example. In this case, the control unit 60*a* may acquire the above-described various data from the external device through a communication line such as the Internet, when necessary. In addition, the drug database 81 may be updated by adding new drug data.

[Outline of Processing in Drug Sorting Device 1]

In the drug sorting device 1, the conveying/sorting unit 12 conveys each drug returned to the first accommodation unit 11 to the imaging unit 13. The imaging unit 13 sequentially images each conveyed drug. The control unit 60*a* discriminates a type of each drug, based on the captured image, and determines a sorting position of each discriminated drug in the second accommodation unit 14. The conveying/sorting unit 12 conveys each drug to the determined sorting position. Information on the drug accommodated in the second accommodation unit 14 is written to the RFID tag of the sorting cup 141, is stored in the storage unit 80, or is displayed on the touch panel 3. In addition, after the drug is completely sorted or while the drug is sorted, a user operates the touch panel 3 to perform processing such as a visual inspection and packaging. Hereinafter, each processing will be specifically described.

[Drug Conveying Processing to Imaging Unit 13]

First, drug conveying processing from the first accommodation unit 11 to the imaging unit 13 will be described with reference to FIGS. 1 and 2001 in FIG. 2.

Specifically, the conveying/sorting unit 12 conveys the drug accommodated in the first accommodation unit 11 to a receiving region Ar1 (refer to 3002 in FIG. 3) where the imaging unit 13 receives the drug. The conveying control unit 61 controls the conveying processing of the conveying/sorting unit 12.

The conveying/sorting unit 12 includes a second camera 121, a suction/shutter mechanism 122, and a conveying mechanism 123.

The second camera 121 sequentially captures images of the first accommodation unit 11 to specify the drug of the conveying target. The imaging control unit 63 controls imaging processing of the second camera 121. The second camera 121 is provided in an end portion of the conveying/sorting unit 12 (specifically, a housing including at least the suction/shutter mechanism 122) on a side facing the base 19. The second camera 121 may be provided in a tip portion of a suction mechanism (to be described later). The imaging control unit 63 analyzes the captured image, and determines whether or not the image includes the drug. When it is determined that the drug is included, for example, the conveying control unit 61 moves the above-described tip portion closer to the first accommodation unit 11, and specifies the drug included in the image captured at that time, as the drug of the conveying target.

The suction/shutter mechanism 122 includes a suction mechanism that suctions the drug specified as the conveying target, and a shutter mechanism that prevents the drug suctioned by the suction mechanism from dropping. The suction mechanism is provided to be movable in a Z-axis direction. The shutter mechanism is provided in front of the above-described end portion to be movable substantially parallel to an XY-plane.

The suction mechanism extends from the above-described end portion when acquiring the drug, suctions the specified drug in the tip portion, and thereafter, returns to a position of the above-described end portion. In this state, the conveying control unit 61 moves the shutter mechanism to a position facing the above-described end portion, and maintains a position of the shutter mechanism (brought into a closed state) while the drug is conveyed. When the conveying control unit 61 moves the suction/shutter mechanism 122 to a position facing a drug placement table 133*a* (refer to 3002 in FIG. 3) of a drug holding mechanism 133 disposed in the receiving region Ar1, the shutter mechanism is moved to a position which does not face the above-described end portion (brought into an open state). After the suction mechanism is extended from the above-described end portion, a suction state is released to place the drug on the drug placement table 133*a*.

The conveying mechanism 123 is controlled by the conveying control unit 61 to move the suction/shutter mechanism 122 in X-axis and Y-axis directions. The conveying mechanism 123 enables moving the suction/shutter mechanism 122 when searching for the drug of the conveying target on the first accommodation unit 11, or conveying the drug from the first accommodation unit 11 to the drug placement table 133*a*. In addition, in the drug sorting processing, the drug can be conveyed from the drug placement table 133*a* to the second accommodation unit 14, the standby tray 15, or the collection tray 16. In the drug sorting processing, the sorting control unit 62 controls the conveying/sorting unit 12, based on a discrimination result of the discrimination unit 65, and conveys the drug disposed in the receiving region Ar1 to the predetermined sorting cup 141 of the second accommodation unit 14 or the standby tray 15.

[Drug Imaging Processing]

Figure 3:
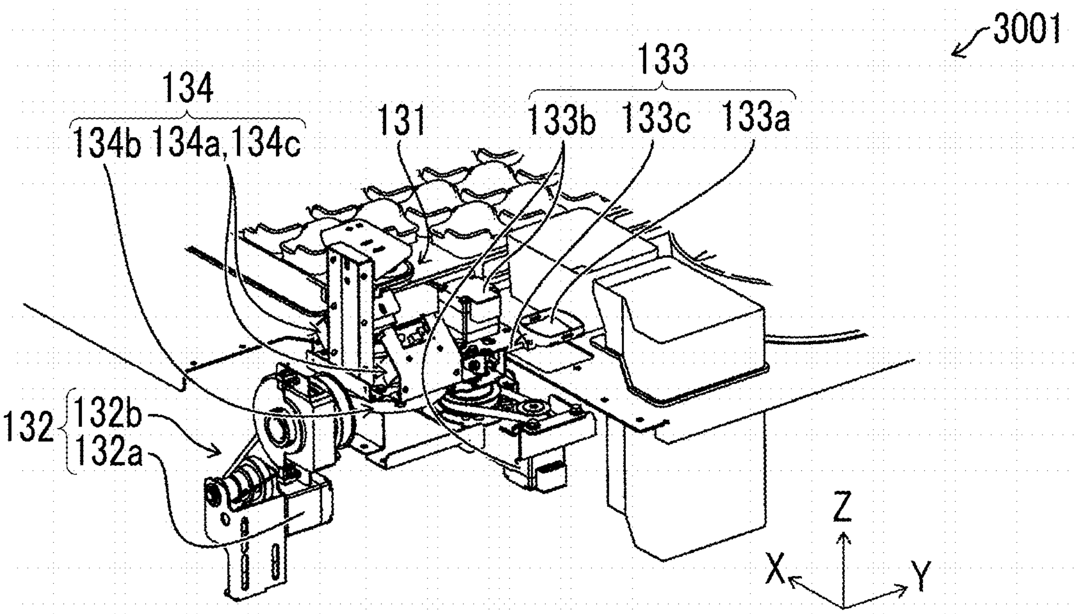
FIG. 3 is a perspective view illustrating an overall configuration of an imaging unit, and a perspective view illustrating an example of a drug placement table.
Figure 3:
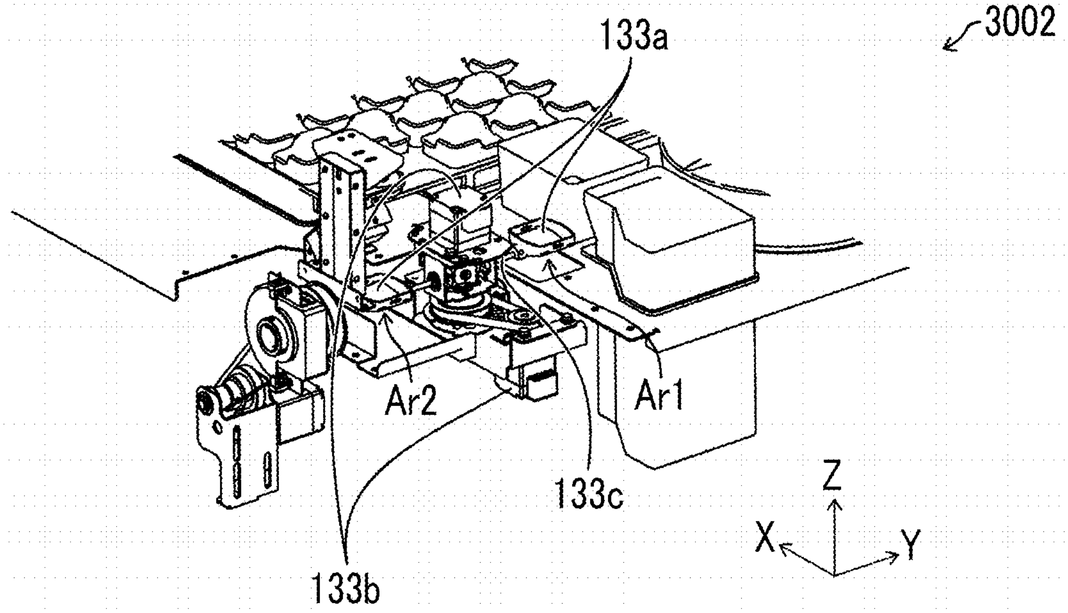
Figure 3:
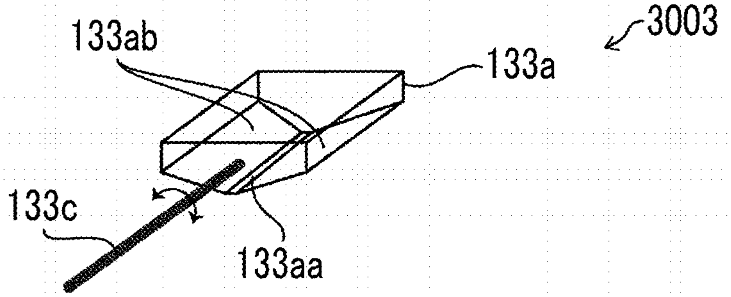
Figure 4:
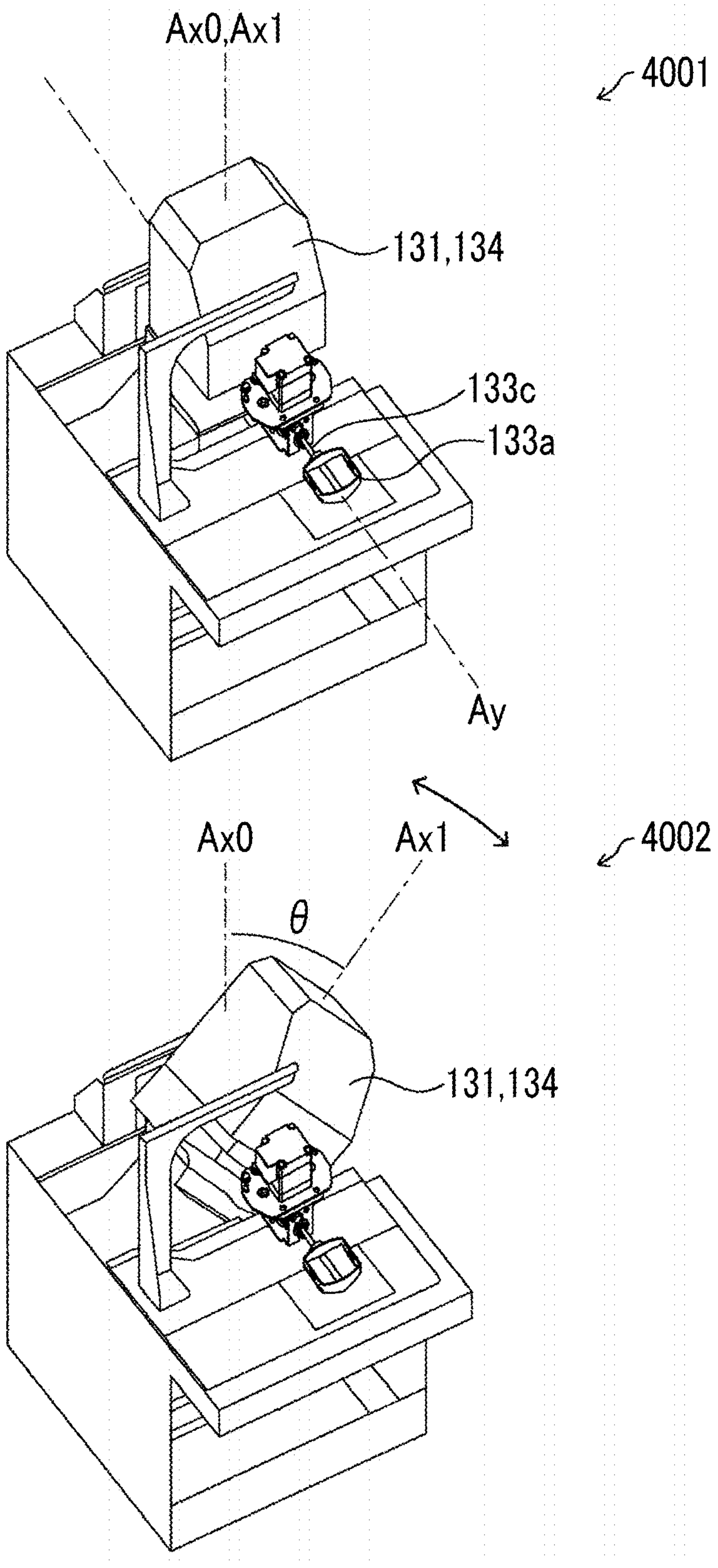
FIG. 4 is a view for describing turning of the imaging unit.

Next, drug imaging processing of the imaging unit 13 will be described with reference to FIG. 1, 2002 in FIG. 2, and FIGS. 3 and 4. 3001 and 3002 in FIG. 3 are perspective views illustrating an overall configuration of the imaging unit 13, and 3003 in FIG. 3 is a perspective view illustrating an example of the drug placement table 133*a*. 4001 and 4002 in FIG. 4 are views for describing turning of the imaging unit 13. The above-described drug imaging processing is mainly performed by the imaging unit 13 and the imaging control unit 63.

Specifically, the imaging unit 13 is placed on the drug placement table 133*a*, and images the drug disposed in a disposition region Ar2 (imaging region) where the drug of an imaging target illustrated in 3002 in FIG. 3 is disposed. The imaging control unit 63 controls imaging processing of the imaging unit 13, turning movement of the first camera 131 and an illuminator 134, and movement of the drug holding mechanism 133. As illustrated in FIGS. 1 and 3, the imaging unit 13 includes the first camera 131 (imaging section), a rotation mechanism 132 (pivoting unit), the drug holding mechanism 133 (drug placement table or moving mechanism), and the illuminator 134 (ultraviolet light irradiation unit or visible light irradiation unit).

The first camera 131 images the drug disposed in the disposition region Ar2 facing the first camera 131 in order to discriminate the type of the drug in the discrimination unit 65 (to be described later). The drug holding mechanism 133 is a mechanism for holding the drug, and as illustrated in 3001 and 3002 in FIG. 3, the drug holding mechanism 133 includes a drug placement table (Schale) 133*a*, a turning mechanism 133*b* (moving mechanism), and a shaft portion 133*c* that connects the drug placement table 133*a* and the turning mechanism 133*b*. The drug placement table 133*a* is used to place the drug of the imaging target. The turning mechanism 133*b* moves the drug placement table 133*a*, and specifically, turns the drug placement table 133*a* with respect to the XY-plane, and turns the shaft portion 133*c* in a circumferential direction of the shaft portion 133*c*.

When the drug conveyed from the first accommodation unit 11 is placed on the drug placement table 133*a*, the imaging control unit 63 drives the turning mechanism 133*b* to move the drug placement table 133*a* from the receiving region Ar1 to the disposition region Ar2. Thereafter, at least the first camera 131 and the illuminator 134 are controlled to image the drug disposed in the disposition region Ar2. The captured image is stored in the storage unit 80 as the captured image 82. For example, after the drug is completely imaged, the imaging control unit 63 drives the turning mechanism 133*b* to move the drug placement table 133*a* on which the imaged drug is placed, from the disposition region Ar2 to the receiving region Ar1.

In the present embodiment, two drug placement tables 133*a* are provided in the tip portion (end portion) of the shaft portion 133*c*. When one drug placement table 133*a* is disposed in the disposition region Ar2, the turning mechanism 133*b* turns the shaft portion 133*c* to dispose the other drug placement table 133*a* in the receiving region Ar1. When the drug is imaged in the disposition region Ar2, the conveying/sorting unit 12 conveys the drug from the first accommodation unit 11 to the drug placement table 133*a* existing in the receiving region Ar1. In this manner, continuous drug imaging processing can be performed. It is assumed that the drug placement table 133*a* is in a state where the drug is not placed after the drug sorting processing to the second accommodation unit 14 is completed.

In addition, in the present embodiment, the drug placement table 133*a* has transparency. Therefore, the first camera 131 can image the drug placed on the drug placement table 133*a* from many directions through the drug placement table 133*a*.

In addition, as illustrated by 3003 in FIG. 3, the drug placement table 133*a* may have a substantially V-shaped cross section in a state where a bottom portion is recessed. In addition, as illustrated by 3003 in FIG. 3 and FIG. 4, when the drug placement table 133*a* is disposed in the receiving region Ar1 and the disposition region Ar2, a groove direction of the substantially V-shaped cross section (extending direction of the shaft portion 133*c*) is substantially parallel to a turning axis Ay of the imaging mechanism (to be described later) by the rotation mechanism 132. In addition, the bottom portion of the drug placement table 133*a* may not have a V-shape with an acute angle. As illustrated by 3003 in FIG. 3, the bottom portion may include a bottom surface portion 133*aa* and an inclined surface portion 133*ab* inclined from two locations facing the bottom surface portion 133*aa*. A shape of the bottom portion may be formed to such an extent that information indicated by an engraved mark or a print of the drug (engraved mark information or printed information) can be recognized even when viewed from a back side of the drug placement table 133*a* (even when the image is captured), and to such an extent that the drug is fixed.

When the drug is a capsule or a deformed tablet (for example, a rugby ball shape), as long as the bottom portion of the drug placement table 133*a* is flat, a direction of the drug is not aligned on the XY-plane, thereby causing a possibility that a clear image of the drug (engraved mark information or printed information) may be less likely to be acquired. When the cross section is substantially V-shaped, the capsule or the deformed tablet can be fitted to a lowermost end portion to fix the drug. Therefore, it is easier to acquire the clear image of the drug. In a case of the tablet, for example, the shaft portion 133*c* may be turned in the circumferential direction of the shaft portion 133*c*. In this manner, a plane portion (inclined surface portion 133*ab*) of the drug placement table 133*a* may face the first camera 131 so that the drug may not be reliably moved.

Alternatively, the turning mechanism 133*b* can vibrate (move or shake a little) the drug placement table 133*a*. In this case, for example, the capsule placed on the drug placement table 133*a* is vibrated and rolled. In this manner, a printed portion of the capsule can be directed in a predetermined direction (for example, the portion can face the first camera 131 disposed at an initial position to be described later). In addition, due to the above-described vibration, for example, even when a cylindrical tablet (bottom portion has a circular shape) is placed in an erected state on the above-described plane portion, the tablet can be laid down (can be disposed so that the bottom portion of the tablet faces the plane portion).

Under the control of the imaging control unit 63, the illuminator 134 emits light to irradiate the drug, when the drug is imaged. As illustrated by 3001 in FIG. 3, the illuminator 134 includes a visible light irradiation unit (first irradiation unit 134*a* and second irradiation unit 134*b*) that irradiates the drug with visible light, and an ultraviolet light irradiation unit 134*c* that irradiates the drug with ultraviolet light.

The first irradiation unit 134*a* and the second irradiation unit 134*b* irradiate the drug with white light as visible light. The first irradiation unit 134*a* is a bar-shaped visible light source (bar illumination), and the second irradiation unit 134*b* is a ring-shaped visible light source (ring illumination). The first camera 131 acquires an image based on the visible light (visible light image) by receiving the visible light emitted from the first irradiation unit 134*a* or the second irradiation unit 134*b* and reflected on the drug. The imaging control unit 63 stores image data indicating a visible light image acquired by the first camera 131 in the storage unit 80 as the captured image 82.

The ultraviolet light irradiation unit 134*c* excites ingredients included in the drug by irradiating the drug with ultraviolet light (for example, light having a peak wavelength of 365 nm or longer and 410 nm or shorter). In this manner, fluorescence (for example, light having a peak wavelength of 410 nm or longer and 800 nm or shorter) is fetched from the drug. The first camera 131 acquires an image based on the ultraviolet light (ultraviolet light image) by receiving the fluorescence emitted from the drug. The imaging control unit 63 stores the image data indicating the ultraviolet light image acquired by the first camera 131 in the storage unit 80 as the captured image 82.

As illustrated in FIGS. 3 and 4, the rotation mechanism 132 causes the first camera 131 to pivot to turn around the disposition region Ar2 (drug placement table 133*a* disposed at that position) where the drug of the imaging target is disposed. The first camera 131 images the drug disposed in the disposition region Ar2 from a plurality of positions pivoted by the rotation mechanism 132. Specifically, the imaging mechanism including the first camera 131 and the illuminator 134 pivots to turn around the disposition region Ar2. Therefore, the first camera 131 can image the drug from a plurality of directions while maintaining a positional relationship between the first camera 131 and the illuminator 134 with respect to the disposition region Ar2.

The rotation mechanism 132 includes an imaging mechanism drive unit 132*a* and a power transmission mechanism 132*b*, as illustrated by 3001 in FIG. 3. The imaging mechanism drive unit 132*a* generates power for turning the imaging mechanism around the disposition region Ar2. The power transmission mechanism 132*b* transmits the power generated by the imaging mechanism drive unit 132*a* to the imaging mechanism. The imaging mechanism drive unit 132*a* is driven under the control of the imaging control unit 63, and changes a position of the imaging mechanism around the disposition region Ar2.

The rotation mechanism 132 turns the imaging mechanism between an initial position and a position facing the initial position. The initial position is a position substantially perpendicular to the disposition region Ar2, and is a position above the disposition region Ar2. The position facing the initial position is a position substantially perpendicular to the disposition region Ar2, and is a position below the disposition region Ar2. In addition, it can be described that the position is a position facing the bottom portion of the drug placement table 133*a* where the first camera 131 exists in the disposition region Ar2.

As illustrated in FIG. 4, an axis passing through the center of the disposition region Ar2 and parallel to the Z-axis is set as an axis Ax0, and an axis passing through the center of the disposition region Ar2 and the center of the imaging mechanism is set as an axis Ax1. In addition, an angle between the axis Ax0 and the axis Ax1 is set as θ. In the present embodiment, the rotation mechanism 132 disposes the imaging mechanism at any one position of θ=0° (initial position), 45°, 135° and 180°. 4001 in FIG. 4 illustrates a case where the imaging mechanism is located at a position of θ=0°, and 4002 in FIG. 4 illustrates a case where the imaging mechanism is located at a position of θ=45° after being turned from the initial position.

In this way, since the imaging mechanism turns around the disposition region Ar2, the drug can be imaged from the plurality of directions while the drug is fixed in the disposition region Ar2. In addition, even in a case where the drug (tablet) is erected even when the drug placement table 133*a* is shaken, information indicated by the engraved mark assigned to the drug can be acquired by imaging the drug from an oblique direction (θ=45° or 135°).

The drug may be imaged from the plurality of directions by fixing the imaging mechanism and causing the drug to pivot.

(Imaging Position Control)

Next, an example of position control of the imaging mechanism will be described. The imaging control unit 63 first sets the imaging mechanism at the initial position, and causes the first camera 131 to image the drug disposed in the disposition region Ar2 at the initial position. At this time, the first camera 131 acquires visible light images (two visible light images), based on the visible light from the first irradiation unit 134*a* and the second irradiation unit 134*b*, and acquires an ultraviolet light image based on the ultraviolet light from the ultraviolet light irradiation unit 134*c*.

Next, the imaging control unit 63 sets the imaging mechanism at a position facing the initial position, causes the first camera 131 to image the drug disposed in the disposition region Ar2 at the position, and acquires the two visible light images and the ultraviolet light image. The discrimination unit 65 discriminates a type of the drug by analyzing the six images. When the type of the drug cannot be specified as one type, the imaging control unit 63 causes the first irradiation unit 134*a* and the second irradiation unit 134*b* to emit the visible light at positions of θ=45° and 135°, and causes the first camera 131 to image the drug. The discrimination unit 65 discriminates the type of the drug by analyzing the visible light image at this time.

Without being limited to the above-described configuration, various methods are adopted for the position control of the imaging mechanism. For example, after the drug is imaged from the position facing the initial position, the drug may be imaged from the initial position. In addition, drug discrimination processing may be performed based on the visible light image captured from the position of θ=45°. The visible light image when the drug is imaged at a position of θ=135° may be acquired only in a case where the type of the drug cannot be specified as one type. In addition, only the ultraviolet light image may be acquired at the initial position and the position facing the initial position. After the drug discrimination processing is performed based on the ultraviolet light image, the visible light image at the position may be acquired. In addition, the visible light image and the ultraviolet light image may be acquired at all positions.

[Image Processing/Discrimination Processing]

Next, image processing for the image captured by the imaging unit 13 and drug discrimination processing based on a result of the image processing will be described with reference to FIGS. 1 and 5 to 7. The above-described image processing is mainly performed by the feature extraction unit 64, and the discrimination processing is mainly performed by the discrimination unit 65.

The feature extraction unit 64 generates the extraction mark image 83 by extracting the drug mark appearing in the captured image 82 captured by the first camera 131. More specifically, the feature extraction unit 64 uses the trained model 84 constructed to extract the mark formed on the drug, and generates the extraction mark image 83 obtained by extracting the mark (more precisely, a mark region in which the mark appears) from the captured image 82. That is, the feature extraction unit 64 functions as an image generation unit that generates the extraction mark image 83 by using the trained model 84. The feature extraction unit 64 can extract the mark from the visible light image, and can extract the mark from the ultraviolet light image.

The above-described mark is a sign formed on the surface of the drug. For example, letters (including alphabets or numbers), symbols, designs, pictures, and lines (for example, secant lines), or code information such as two-dimensional codes formed to indicate the type of the drug or a manufacturer are also included in a range of the above-described mark. In addition, a method for forming the above-described mark is not particularly limited. For example, the above-described mark may be formed by engraving the mark on the surface of the drug, or may be formed by printing (print) the mark on the surface of the drug.

In addition, the feature extraction unit 64 may perform processing for extracting the features of the drug other than the marks appearing in the captured image 82 by performing image processing (image analysis) on the captured image 82 (visible light image and/or ultraviolet light image). Here, the features of the drug are used as an index for the discrimination unit 65 to discriminate the type of the drug. In addition to the above-described marks (engraved mark, prints, and secant lines), the features of the drug include a size, a shape, and a representative color (color of a region to which the engraved mark or the print is assigned) of the drug.

The feature extraction unit 64 extracts the features of the drug other than the mark by performing existing image processing on the captured image 82. The existing image processing may be processing which can extract a plurality of pixel groups having pixel values different from pixel values of a background portion. For example, known techniques such as optical character recognition (OCR) or pattern matching can be used. For example, the feature extraction unit 64 extracts the size, the shape, and the representative color of the drug from the visible light image, and extracts the representative color from the ultraviolet light image.

(Regarding Trained Model)

In the present embodiment, as an example of the trained model 84, a semantic segmentation model (hereinafter, referred to as an SS model) trained to identify the pixel forming the mark in the image of the drug and the pixel forming the background portion of the mark is used. Since the SS model is used as the trained model 84, the mark having an irregular shape can be accurately extracted.

The SS model is a model based on a convolutional neural network (CNN), and has an encoder-decoder structure to generate an output image having the same size as an input image. For example, an encoder structure is constructed by a first neural network having an input layer, a hidden layer, and an output layer, and a decoder structure is constructed by a second neural network having an inverted structure of the encoder structure. That is, each structure of the input layer, the hidden layer, and the output layer of the decoder structure is the same as each structure of the output layer, the hidden layer, and the input layer of the encoder structure.

When the captured image 82 of the target drug whose type is unidentified is input, the SS model calculates a probability value indicating a probability that each pixel forming the image of the drug appearing in the captured image 82 may be the pixel forming the mark. As the pixel has a higher probability value, there is a higher possibility of the pixel forming the mark, and as the pixel has a lower probability value, there is a higher possibility of the pixel forming the background portion. The SS model outputs data in which the pixel forming the mark and the pixel forming the background portion are distinguished based on the above-described probability value (for example, data in which the pixel forming the background region is classified into 0 and the pixel forming the mark is classified into 1).

Therefore, the feature extraction unit 64 can generate the extraction mark image 83 by performing the image processing on an output value obtained by inputting the captured image 82 captured by the first camera 131 to the SS model. For example, the feature extraction unit 64 may set the pixel having an SS model output value of 0 as (R, G, B)=(255, 255, 255), and the pixel having an SS model output value of 1 as (R, G, B)=(0, 0, 0). In this manner, the extraction mark image 83 is generated in which the pixel forming the background region is represented in white and the pixel forming the mark is represented in black. In this way, the feature extraction unit 64 can generate the extraction mark image 83, based on the output value of the SS model.

The trained model 84 may be a model that outputs the above-described probability value as the output value. In this case, the feature extraction unit 64 determines whether the probability value of each pixel output from the trained model 84 is equal to or greater than a predetermined threshold value, and determines the pixel value of each pixel, based on a determination result thereof. In this manner, the feature extraction unit 64 generates the extraction mark image 83 in which the pixel forming the mark and the pixel forming the background portion are distinguished. In addition, the trained model 84 may be configured to output the extraction mark image 83. In this case, as the extraction mark image 83, the feature extraction unit 64 may use the output value of the trained model 84 as it is.

Figure 5:
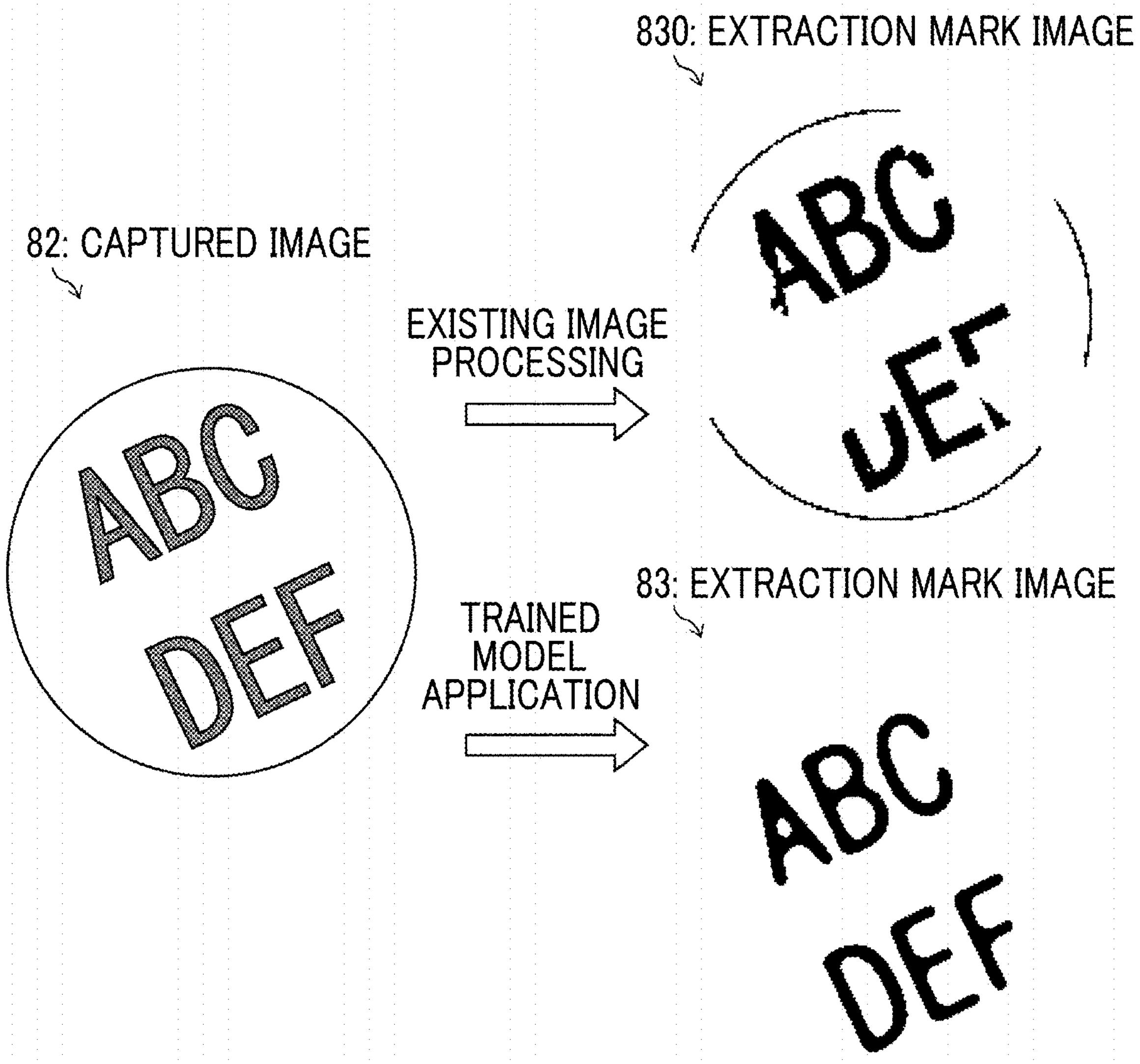
FIG. 5 is a view illustrating an example of a captured image and an example of an extraction mark image extracted from the captured image.
Figure 6:
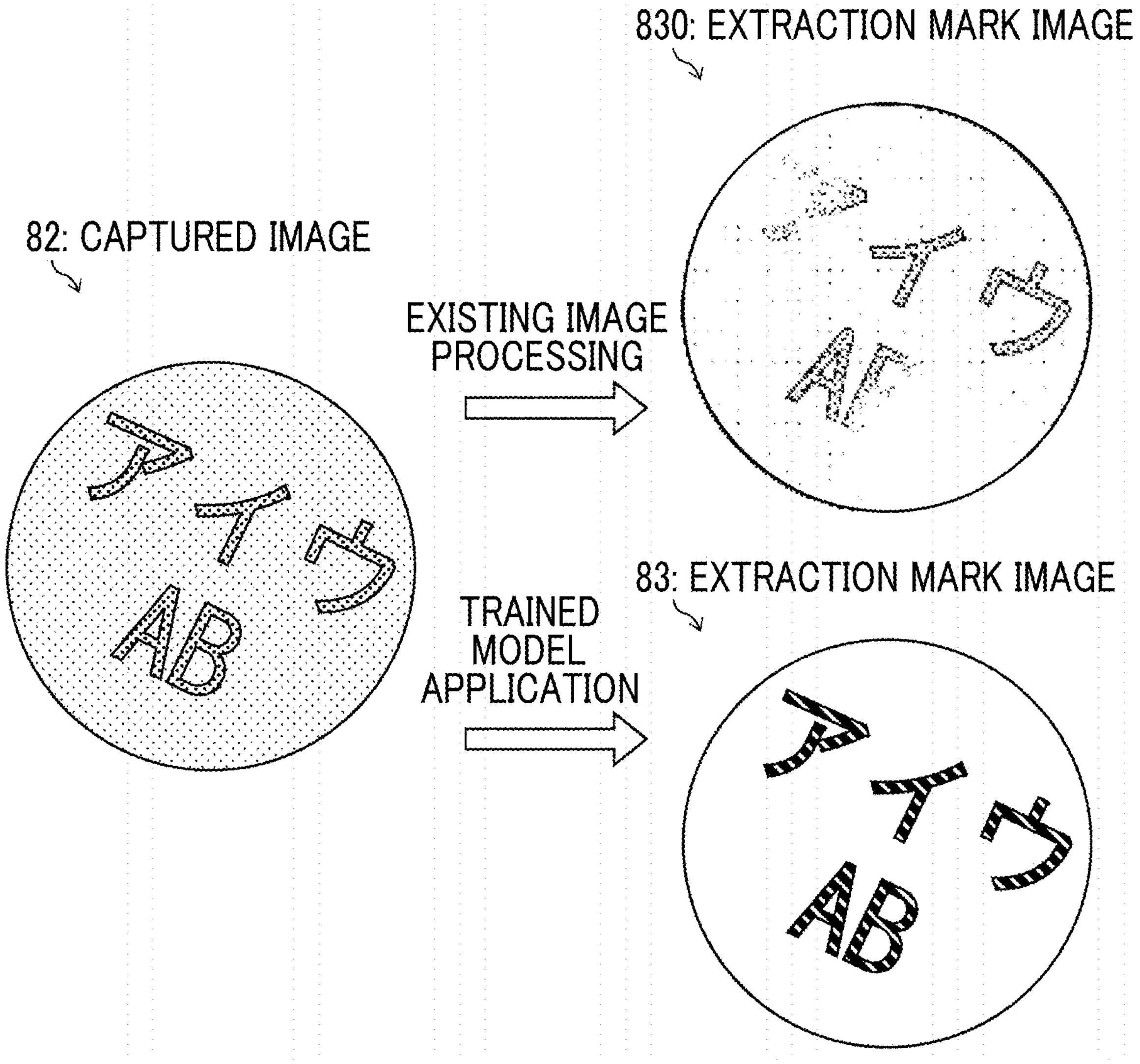
FIG. 6 is a view illustrating another example of the captured image and another example of the extraction mark image extracted from the captured image.

FIGS. 5 and 6 are views illustrating an example of the captured image 82 and examples of extraction mark images 83 and 830 extracted from the captured image 82. The extraction mark image 83 is an image obtained by inputting the captured image 82 into the trained model 84. The extraction mark image 830 is an image obtained as a result of performing the existing image processing on the captured image 82 without using the trained model 84. FIG. 5 illustrates an example of the captured image 82 of the drug having no pattern in the background portion of the engraved mark, and FIG. 6 illustrates an example of the captured image 82 of the drug having a pattern in the background portion of the engraved mark. In addition, the "pattern" may look like a pattern shape depending on constituents of the drug.

When the engraved mark of the drug is extracted, a portion of the engraved mark and a background region thereof may be less likely to be distinguished from each other, depending on how light illuminates the drug. This portion cannot be recognized as the engraved mark by performing general image processing in the related art using edge detection or binarization processing, and a detection result shows that a portion of the engraved mark is absent as in the extraction mark image 830 in FIG. 5. In this regard, since the trained model 84 is a model in which the mark is trained, the whole engraved mark can be accurately extracted as in the extraction mark image 83 in FIG. 5.

In addition, the pixel value of the constituent particle of the drug appearing in the background region (that is, the drug surface) of the engraved mark may be close to the pixel value of the engraved mark. In this case, in general image processing in the related art, as in the extraction mark image 830 in FIG. 6, a portion of the background region may be determined as the engraved mark, or a boundary between the engraved mark and the background region may be erroneously determined. In this regard, since the trained model 84 is a model in which the mark is trained, the whole engraved mark can be accurately extracted as in the extraction mark image 83 in FIG. 6.

The discrimination unit 65 collates the extraction mark image 83 generated by the feature extraction unit 64 with the registration mark image registered in advance for each type of the drug, and discriminates the type of the target drug, based on a collation result thereof. Since the registration mark image is registered in the drug database 81, the discrimination unit 65 can perform the above-described discrimination by referring to the drug database 81.

In collation between the extraction mark image 83 and the registration mark image, an image obtained by performing blurring processing on the extraction mark image 83 may be used. That is, the discrimination unit 65 may discriminate the type of the target drug, based on a collation result between the image obtained by performing the blurring processing on the extraction mark image 83 and the registration mark image.

The reason of performing the blurring processing is as follows. As a result of studies by the inventors of the present application, it has been found that accuracy in discriminating the type of the target drug is improved by performing the blurring processing, compared to a case where the blurring processing is not performed. That is, according to the above-described configuration, the accuracy in discriminating the type can be improved. When the blurring processing is performed on the extraction mark image 83, it is desirable that the same blurring processing is performed on the registration mark image. In addition, a method for the blurring processing is not particularly limited, and for example, processing for applying a smoothing filter to the extraction mark image 83 may be used as the blurring processing. For example, the smoothing filter includes a binomial (binomial distribution type) filter, a median filter, a Gaussian filter, and a bilateral filter. In addition, the blurring processing can be performed by simple averaging, k-nearest neighbor, gradient calculation, or histogram smoothing.

The trained model 84 can also be used when the registration mark image is generated. That is, the image of the drug whose type is known may be input to the trained model 84, and the extraction mark image generated based on the output value output from the trained model 84 may be used as the registration mark image of the drug.

In addition, as described above, the feature extraction unit 64 may extract features of the drugs other than the mark. In this case, the features of the drug other than the mark may be registered in the drug database 81 for each type of the drug, and may be used as master data. The discrimination unit 65 may collate each feature extracted by the feature extraction unit 64 with the master data to discriminate the type of the target drug.

For example, it is assumed that the feature extraction unit 64 analyzes the captured image 82 and extracts each information indicating the size, the shape, and the representative color of the drug as the features of the drug. In this case, the discrimination unit 65 can narrow the types of the drugs which coincide with the features extracted by the feature extraction unit 64 from the sizes, the shapes, and the representative colors of various drugs registered in the master data. The discrimination unit 65 may specify the type of the target drug by collating the extraction mark image 83 with the registration mark image for each of the narrowed types. In addition, it is optional to use any type of the features and to narrow the types in any order.

In addition, the discrimination unit 65 may rank candidates for the type of the drug, based on a coincidence degree between the extracted drug feature and the drug feature included in the drug database 81. For example, the discrimination unit 65 may rank the candidates for the type extracted based on the representative color, based on a coincidence degree between the extracted representative color and master color data, and thereafter, may discriminate the type, based on other features, in accordance with the ranking.

In addition, when the extracted features (target features) of the drug are not present in the drug database 81, in a case where it is estimated as the drug (tablet or capsule) based on at least a portion of the target features, the discrimination unit 65 discriminates the type of the drug as an estimated drug. In this case, the estimated drug can also be a sorting target to the second accommodation unit 14 or the standby tray 15. In the present embodiment, the estimated drug may be temporarily placed on the standby tray 15 first.

The discrimination unit 65 outputs the discrimination result of the type of the target drug to the sorting control unit 62. For example, when the type of the target drug can be specified as one type, or when the number of candidates is narrowed to a predetermined number or less, the drug data related to the drug is output as the discrimination result. In this case, the discrimination unit 65 associates the drug data related to the drug with the captured image 82 of the drug, and stores the associated data in the storage unit 80.

When the discrimination unit 65 discriminates the type of the target drug as the estimated drug, the discrimination unit 65 outputs the features of the drug (features of an object estimated as the estimated drug) as the discrimination result. On the other hand, when the discrimination unit 65 discriminates that the drug is registered as the drug to be discarded in the drug database 81, or when the discrimination unit 65 discriminates that an object accommodated in the first accommodation unit 11 is a foreign substance other than the drug, the discrimination unit 65 outputs the discrimination result indicating that the drug is out of a sorting target.

(Effects of Image Processing and Discrimination Processing in Present Embodiment)

As described above, various contents of the mark formed on the drug exist, and an appearance of the mark in the captured image 82 is changed depending on how light illuminates the drug at the time of imaging. Therefore, it is difficult to highly accurately discriminate the type of the drug, based on the mark. Therefore, in order to highly accurately discriminate the type of the drug, it is necessary to highly accurately extract the mark formed on the drug, regardless of a change in the appearance of the mark in the captured image 82, while dealing with the variety of the marks.

The feature extraction unit 64 generates the extraction mark image 83 on which the mark formed on the target drug is extracted from the captured image 82, by using the trained model 84 constructed to extract the mark formed on the drug. Therefore, the feature extraction unit 64 can (1) deal with the variety of the marks, (2) does not depend on a change in the appearance of the mark in the captured image 82, and (3) can accurately extract the mark of the target drug from the captured image 82 even when the target drug has a pattern.

In addition, since the trained model 84 has the trained mark, even when the mark is not trained by the trained model 84, when the mark is similar to the trained mark, the mark can be extracted from the captured image 82. Furthermore, the feature extraction unit 64 can extract the mark from the captured image 82 regardless of a position or an orientation of the mark in the captured image 82.

In addition, any configuration may be adopted as long as the mark formed on the target drug can be extracted by using the trained model 84. Therefore, in order to construct this trained model 84, it is not necessary to use the captured images of all types of drugs which can be handled by the drug sorting device 1. Therefore, various marks can be accurately extracted by using the trained model 84 constructed without requiring a large amount of costs.

Here, when the trained model is used to discriminate the type of the target drug, it is conceivable to construct the following trained model. Comparative Example 1: a trained model in which a drug image and a drug type (classification label) are associated and trained. Comparative example 2: a trained model in which individual letters and numbers are trained. In this case, the trained model is used so that the letters or the numbers assigned to the drug are extracted one by one from the drug image, and the type of the drug is discriminated from a combination of the extracted letters or numbers.

However, in a case of Comparative Example 1, it is necessary to prepare and learn a large amount of teacher data for each type of the drug. Therefore, there is a problem in that a lot of labor is required for constructing a model which can determine the type of many types of the drugs. In addition, since it is difficult to learn all types of the drugs, there is a possibility that an image of a drug whose type is not trained may be input. However, in this case, it is difficult to predict what discrimination result will be output from the trained model. Poor explanation of the discrimination result is a major negative factor in the discrimination of the type of the drug, which is important discrimination related to a patient's health. In addition, the trained model is less likely to discriminate drugs having only a slight difference in the marks, as different drugs.

In addition, in Comparative Example 2, there is a possibility that an untrained mark, or an image of a drug to which letters or numbers in a font style different from that used in learning are assigned may be input. In these cases, it is difficult to predict what result will be output from the trained model. In addition, an alignment order of the letters or the numbers is a feature for specifying the type of the drug. However, in some cases, the positions or the orientations of the letters or the numbers may be different depending on each drug, and the drug appearing in the captured image 82 may be oriented in various ways. Therefore, in some case, it may be difficult to correctly reproduce the alignment order of the detected letters or numbers.

In this way, when the type of the target drug is discriminated by using the trained model of Comparative Example 1 or 2, there is a possibility that presenting a validity (evidence) for the discrimination result may be insufficient, and in addition, there is a problem in that reliability of the discrimination result may not be ensured.

On the other hand, the discrimination unit 65 of the present embodiment performs final discrimination of the type of the target drug, based on the collation result between the extraction mark image 83 and the registration mark image. Specifically, the discrimination unit 65 collates the mark accurately extracted by using the trained model 84 and the features other than the mark extracted by using the existing image processing with the drug database 81 to perform the final discrimination of the type of the drug. Therefore, the computer 60 included in the drug sorting device 1 uses the trained model 84 only for extracting at least the mark. Accordingly, presenting the validity for the discrimination result can be more reasonable unlike a case of discriminating the type of the target drug by using the trained model of Comparative Example 1 or 2. That is, according to the drug sorting device 1, the evidence of the discrimination result can be presented.

In addition, particularly with regard to the engraved mark or the secant line, there is a high possibility that the appearance of the engraved mark or the secant line in the captured image 82 may be changed depending on how light illuminates the drug at the time of imaging. With regard to the drug having a shallow depth of the engraved mark or the secant line, there is a high possibility that the above-described appearance may be changed. Therefore, it is difficult to highly accurately extract the engraved mark or the secant line from the captured image 82 by performing the existing image processing. The feature extraction unit 64 uses the trained model 84, particularly when the engraved mark or the secant line is extracted from the captured image 82. In this manner, compared to a case of using the existing image processing, the engraved mark or the secant line can be accurately extracted.

(Flow of Discrimination Processing)

Figure 7:
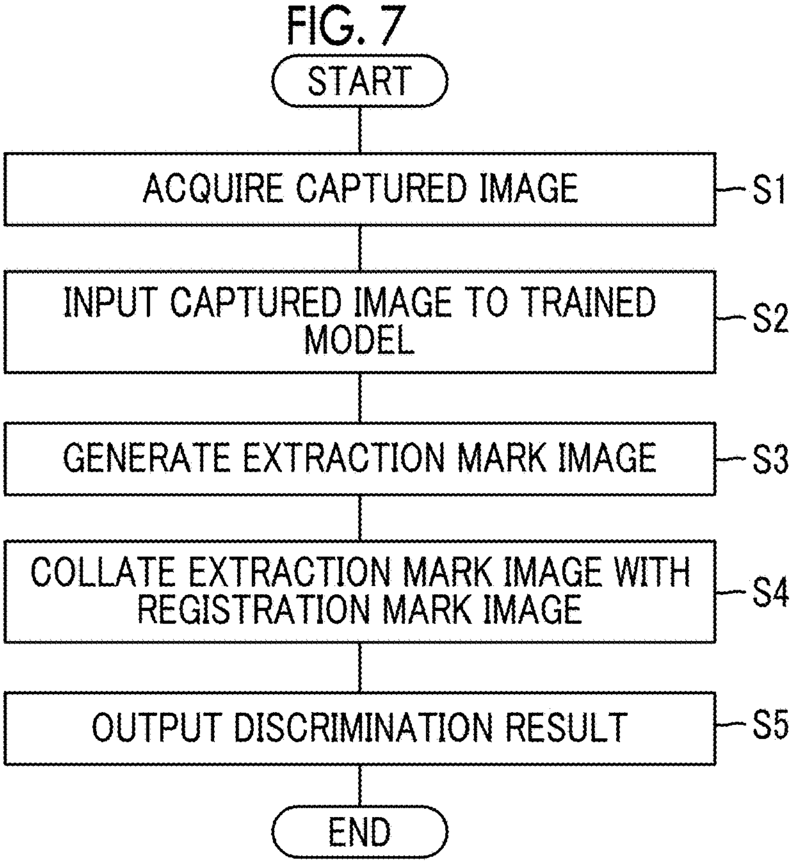
FIG. 7 is a flowchart illustrating an example of a flow of discrimination processing.

FIG. 7 is a flowchart illustrating an example of a flow of discrimination processing (type discrimination method). The control unit 60*a* acquires the captured image 82 stored in the storage unit 80 (S1). The feature extraction unit 64 inputs the acquired captured image 82 to the trained model 84 (S2). The feature extraction unit 64 inputs the captured image 82 to the trained model 84, and generates the extraction mark image 83 (S3, image generation step). As described above, the extraction mark image 83 may be a result of performing the image processing on the output value of the trained model 84, or the output result itself of the trained model 84. Alternatively, the extraction mark image 83 may be generated, based on the probability value output from the trained model 84.

Thereafter, the discrimination unit 65 collates the extraction mark image 83 generated by the feature extraction unit 64 with the registration mark image included in the drug database 81 (S4, discrimination step). In addition, in S4, the discrimination unit 65 may perform the existing image processing on the acquired captured image 82 to extract features other than the mark of the target drug from the captured image 82, and may collate the features with various master data included in the drug database 81. In this way, in S4, the type of the target drug is discriminated, based on the collation result between the extraction mark image 83 generated in S3 and the registration mark image. Thereafter, the discrimination unit 65 outputs the discrimination result of the type of the target drug, based on the collation results (S5).

(Example of Constructing Trained Model)

Figure 8:
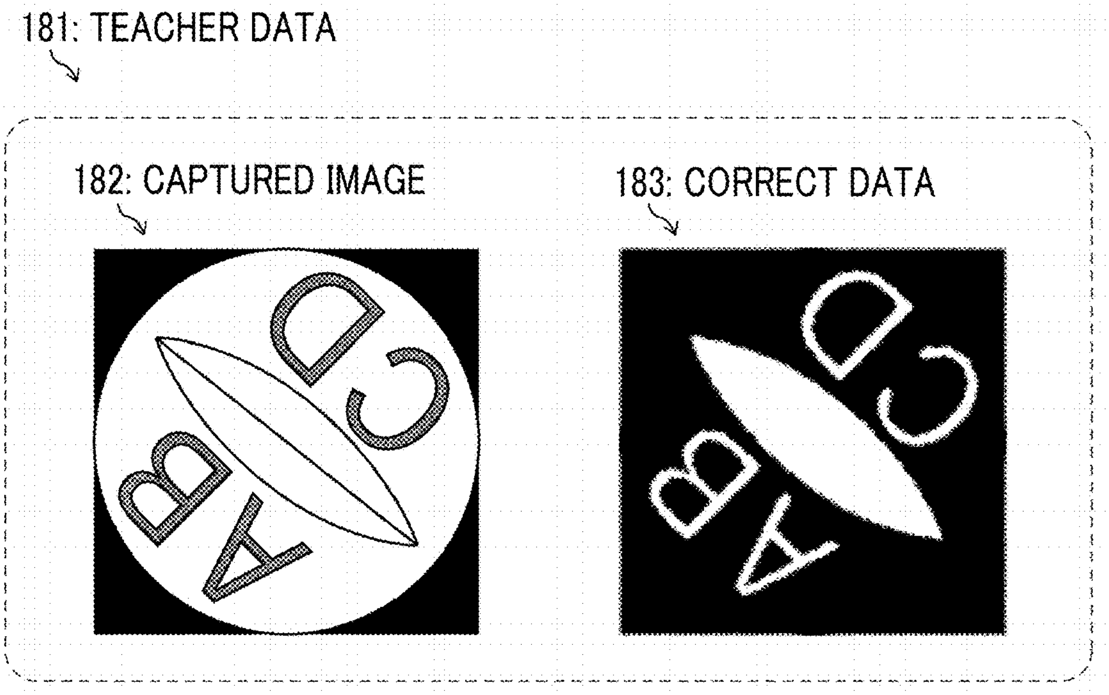
FIG. 8 is a view illustrating an example of teacher data.

For example, the trained model 84 is constructed as follows. FIG. 8 is a view illustrating an example of teacher data 181. The teacher data 181 is data in which the captured image 182 obtained by imaging the drug whose type is known and correct data 183 of the captured image 182 are associated with each other. The correct data 183 is data obtained by extracting the mark from the captured image 182. For example, the correct data 183 is generated as follows. Through a user input, an outer edge of the mark is specified in the captured image 182, and an inner side of a region surrounded by the specified outer edge is distinguished from an outer side of the region. In an example in FIG. 8, an inner region (that is, a mark region) and an outer region (that is, a background region) of the engraved mark and the secant line which are specified in the captured image 182 are distinguished from each other by performing binarization processing. A plurality of the teacher data 181 is prepared by preparing a plurality of the captured images 182 and associating the correct data 183 with each of the captured images 182 as the teacher data 181.

The trained model 84 is constructed by sequentially inputting the teacher data 181 and performing machine learning. For example, the trained model 84 is constructed by a model generation device (not illustrated), but the configuration is not limited thereto. For example, the trained model 84 may be constructed by the computer 60. In this case, the computer 60 also functions as a learning device that constructs the trained model 84 through machine learning using the teacher data 181.

[Drug Sorting Processing]

Next, the above-described drug sorting processing based on the result of the discrimination processing will be described with reference to FIG. 1. The above-described drug sorting processing is mainly performed by the conveying/sorting unit 12 and the sorting control unit 62.

The conveying/sorting unit 12 sorts the drugs for each type, based on the discrimination result of the discrimination unit 65, and accommodates the drugs in the second accommodation unit 14 or the standby tray 15. The sorting control unit 62 controls the conveying/sorting unit 12, and conveys the drug disposed in the receiving region Ar1 after the imaging and discrimination processing to the predetermined sorting cups 141 of the second accommodation unit 14 or the standby tray 15, based on the discrimination result.

When receiving the drug discrimination result, the sorting control unit 62 determines a sorting position for accommodating the drug, associates the discrimination result with the determined sorting position, and stores the associated data in the storage unit 80. Specifically, the sorting control unit 62 determines whether or not the same discrimination result as the above-described discrimination result is stored in the storage unit 80.

When the same discrimination result as the above-described discrimination result is stored, the sorting cup 141 associated with the stored discrimination result is determined as the sorting position. In addition, when the sorting position associated with the stored discrimination result (for example, the estimated drug) is the standby tray 15, the standby tray 15 is determined as the sorting position. On the other hand, when the same discrimination result as the above-described discrimination result is not stored, the sorting cup 141 having no accommodated drug (sorting cup 141 which is not determined as the sorting position) is determined as the sorting position. When the drugs are accommodated in all of the sorting cups 141, the standby tray 15 is determined as the sorting position. With regard to the estimated drug, the sorting control unit 62 may determine any sorting cup 141 included in a predetermined region of the second accommodation unit 14 instead of the standby tray 15 as the sorting position.

After determining the sorting position, the sorting control unit 62 controls the conveying mechanism 123 in the same manner as the conveying control unit 61, and moves the conveying/sorting unit 12 to above the receiving region Ar1. As in the conveying control unit 61, the sorting control unit 62 controls the second camera 121 and the suction/shutter mechanism 122 to suction the drug disposed in the receiving region Ar1. Thereafter, the conveying mechanism 123 conveys the drug to the determined sorting cup 141 or standby tray 15. As described above, since the shutter mechanism is in a closed state while the drug is conveyed, it is possible to prevent the drug from being dropped to a region other than the determined sorting position (for example, the sorting cup 141 other than the determined sorting cup 141). After the drug is conveyed, the drug is accommodated in the sorting cup 141 or the standby tray 15 by releasing the suction. In addition, the sorting control unit 62 counts the number of the drugs accommodated in the sorting cup 141, and stores the counted number in the storage unit 80 in association with the sorting position.

After the sorting control unit 62 conveys the drug (drug after the discrimination is completed) of the drug placement table 133*a* disposed in the receiving region Ar1 to the sorting position, the conveying control unit 61 controls the conveying/sorting unit 12 to convey and place the drug accommodated in the first accommodation unit 11 on the empty drug placement table 133*a*. In this manner, the drug sorting device 1 can continuously discriminate the type of the drug.

In addition, when the sorting control unit 62 receives the discrimination result indicating that the type of the drug cannot be discriminated, the object disposed in the receiving region Ar1 after the discrimination is a foreign substance. Therefore, the foreign substance is conveyed to the collection tray 16.

In this way, the sorting control unit 62 accommodates all of the objects accommodated in the first accommodation unit 11 in either the second accommodation unit 14, the standby tray 15, or the collection tray 16, regardless of the discrimination result of the type of the drug. Therefore, even when the type of the drug cannot be specified or even when the foreign substance is mixed in the first accommodation unit 11, the sorting processing can be continued without being stopped for that reason.

In order to fetch the drug for which the discrimination processing is completed from the drug placement table 133*a* disposed in the receiving region Ar1, the sorting control unit 62 causes the second camera 121 to image the drug placement table 133*a*, and narrows the position of the drug. In addition, in order to fetch the drug from the sorting cup 141 when the drug accommodated in the sorting cup 141 is conveyed to the packaging mechanism 6, the sorting control unit 62 causes the second camera 121 to image the sorting cup 141, and narrows the drug of the conveying target.

In addition, when the drugs are accommodated up to an upper limit value of the number of the drugs accommodated in the sorting cup 141, even when the type of the drug to be sorted is the same as the type of the drug sorted in the sorting cup 141, the sorting control unit 62 accommodates the drug to be sorted in the empty sorting cup 141 different from the sorting cups 141.

In addition, data related to the drug accommodated in the sorting cup 141 by the sorting control unit 62 is stored in the RFID tag provided in the sorting cup 141 by the second RFID reader/writer unit 18.

As in the first RFID reader/writer unit 5, the second RFID reader/writer unit 18 writes various data in the RFID tag, or reads various data stored in the RFID tag. The sorting control unit 62 causes the RFID control unit 68 to write data related to the drug, each time the drug is accommodated in the sorting cup 141. The second RFID reader/writer unit 18 is provided on a lower side of the second accommodation unit 14. Specifically, the second RFID reader/writer unit 18 is provided to face the bottom portion of each of the sorting cups 141 when reading or writing data related to the drug and stored in the RFID tag of each of the sorting cups 141.

Embodiment 2

Another embodiments of the present invention will be described below. For convenience of description, the same reference numerals will be assigned to members having the same functions as those of the members described in the above embodiment, and description thereof will not be repeated. The same applies to subsequent embodiments.

Out of the drugs sorted by the drug sorting device 1, there is a heat-sensitive drug having a possibility that a color may be changed when affected by heat. In some cases, the color of the heat-sensitive drug may be changed after being affected by the heat received from the packaging mechanism 6, particularly a heater roller 6*b* (to be described later), during a series of steps related to the packaging processing. In the present embodiment, a configuration for reducing the possibility that the color of the drug is changed due to the heat of the heater roller 6*b* of the packaging mechanism 6 in the drug sorting device 1 including the packaging mechanism 6 will be described with reference to FIGS. 9 to 11. In Embodiment 2, for the sake of simplification, the heat-sensitive drug will be referred to as a "heating caution drug HMD", and the other drug will be referred to as a "normal drug MD". In addition, simple description of the "drug" is used as a general term for the normal drug MD and the heating caution drug HMD.

Figure 9:
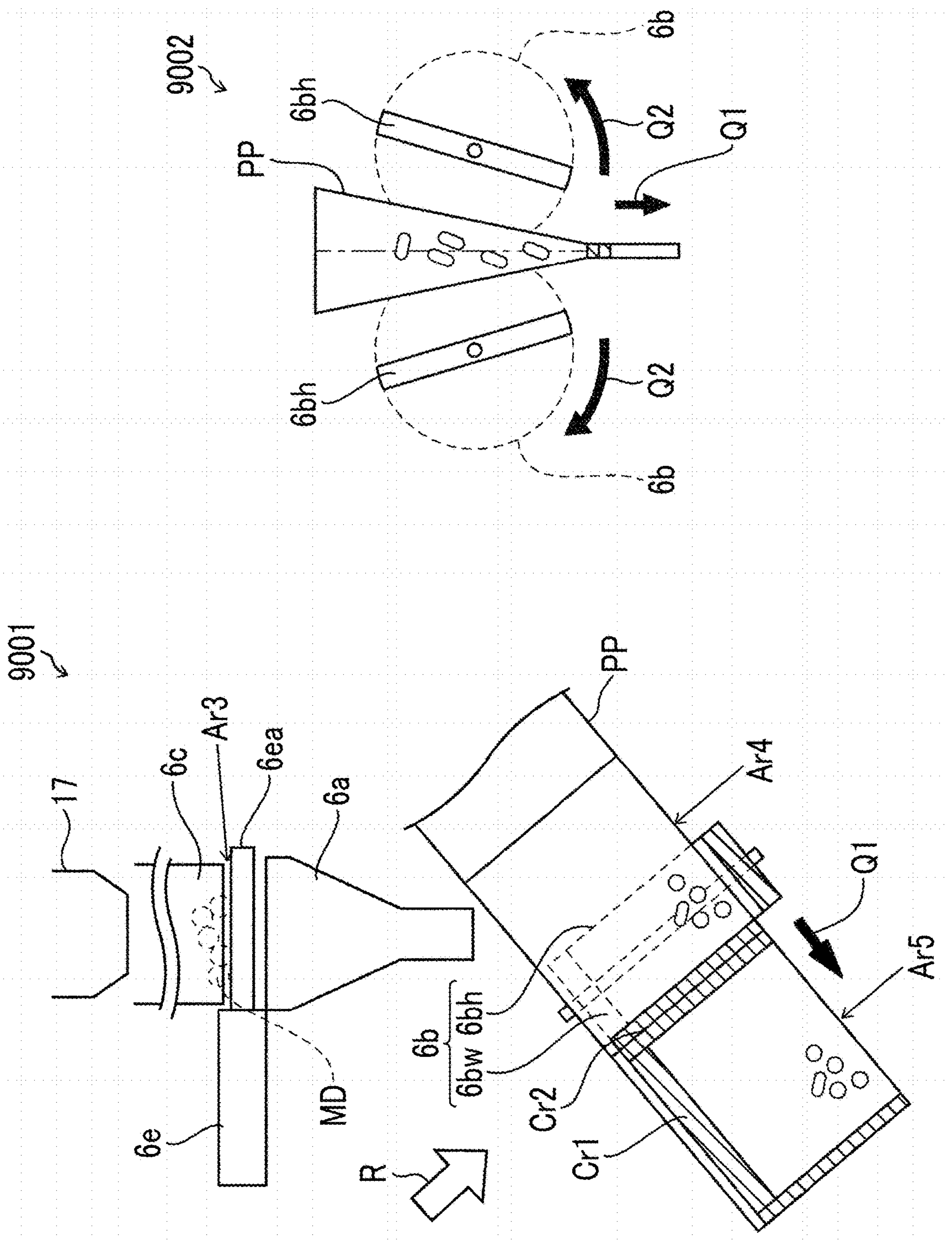
FIG. 9 is a view for describing a packaging operation of a packaging mechanism when a normal drug is packaged.
Figure 10:
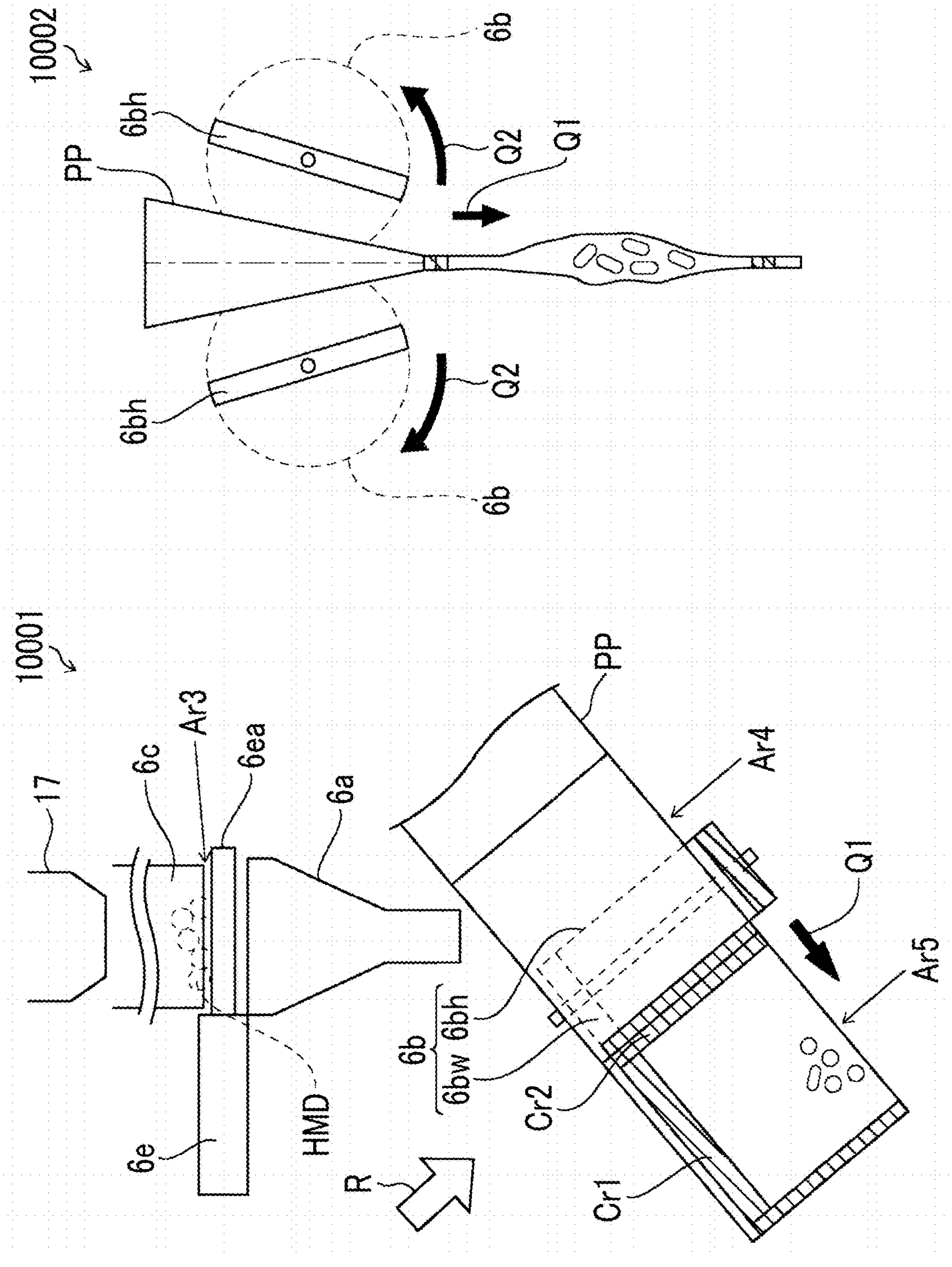
FIG. 10 is a view for describing a packaging operation of the packaging mechanism when a heating caution drug is packaged.
Figure 11:
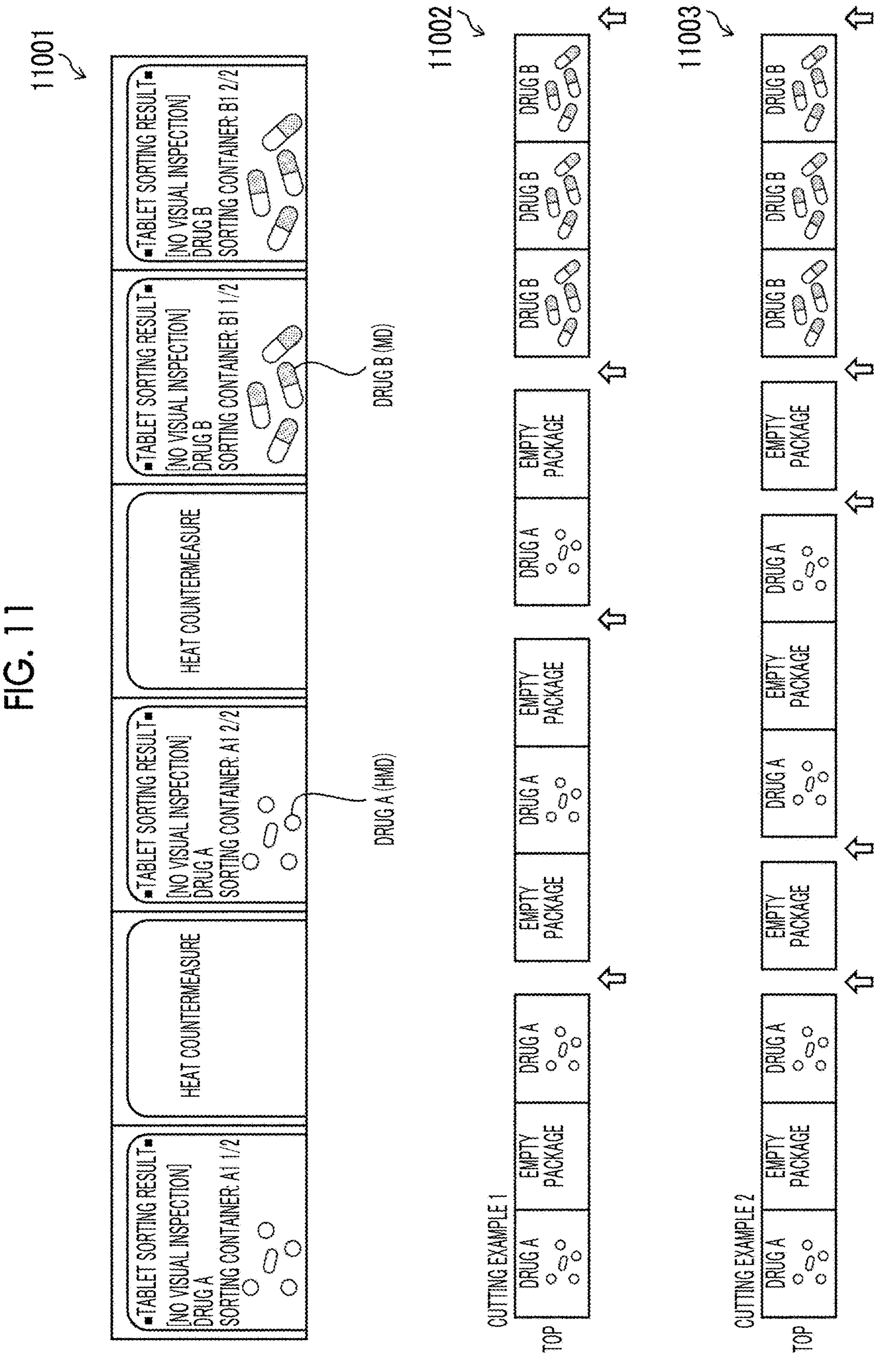
FIG. 11 is a view illustrating a packaging example, a printing example, and a cutting example of a packaging sheet in the packaging mechanism.

FIG. 9 is a view for describing a packaging operation of the packaging mechanism 6 when the normal drug MD is packaged. 9001 in FIG. 9 is a schematic configuration diagram of the packaging mechanism 6. 9002 in FIG. 9 is a schematic view when the heater roller 6*b* is viewed in a direction of a white blank arrow R of 9001. FIG. 10 is a view for describing the packaging operation of the packaging mechanism 6 when the heating caution drug HMD is packaged. 10001 in FIG. 10 is a schematic configuration diagram of the packaging mechanism 6. 10002 in FIG. 10 is a schematic view when the heater roller 6*b* is viewed in the direction of the white blank arrow R of 10001. FIG. 11 illustrates a packaging example of the packaging mechanism 6, a printing example, and a cutting example of a packaging sheet.

As illustrated in FIGS. 9 and 10, the packaging mechanism 6 includes a packaging hopper 6*a*, the heater roller 6*b*, a movement passage 6*c*, and a shutter mechanism 6*e*. The packaging control unit 71 controls the heater roller 6*b* and the shutter mechanism 6*e*.

The packaging hopper 6*a* receives the drug fed from the drug feeding port 17 and passing (dropped) through the movement passage 6*c*, is set in the heater roller 6*b*, and guides the drug to a packaging paper PP located at a standby position Ar4.

The heater roller 6*b* performs heat welding on a portion of the packaging paper PP to package the drugs one by one. The heater rollers 6*b* are a pair of roller mechanisms extending in a direction substantially perpendicular to a conveying direction of the packaging paper PP (direction indicated by an arrow Q1) and provided to pinch the packaging paper. The heater roller 6*b* includes a horizontal welding heater

**6*bw* for welding a horizontal welding portion Cr1 and a vertical welding heater 6*bh* for welding a vertical welding portion Cr2. As the packaging paper PP is conveyed in the conveying direction, while the heater roller 6*b* rotates in a direction of an arrow Q2 illustrated in FIGS. 9 and 10, the horizontal welding portion Cr1 is welded, and the vertical welding portion Cr2** is welded at any interval.

The movement passage **6*c* is provided between the drug feeding port 17 and the packaging hopper 6*a*, and guides the drug fed from the drug feeding port 17 to the packaging hopper 6*a*. In addition, the movement passage 6*c* guides the drug fed to the drug feeding port 17 to a holding region Ar3 on a shutter 6*ea*** (to be described later).

The shutter mechanism **6*e* functions as a drug holding portion in which the holding region Ar3 temporarily holds the drugs fed from the drug feeding port 17 until all of the target drugs to be included in one package prepared by the packaging mechanism 6 are fed from the drug feeding port 17. In other words, the shutter mechanism 6*e* prevents the drugs to be fed to the packaging hopper 6*a* until all of the target drugs to be included in one package are fed from the drug feeding port 17. In the present embodiment, the shutter mechanism 6*e* is provided between the packaging hopper 6*a* and the movement passage 6*c*. However, without being limited thereto, the shutter mechanism 6*e* may be provided inside the packaging hopper 6*a* or the movement passage 6*c***, for example.

In addition, 9001 in FIGS. 9 and 10001 in FIG. 10, the shutter mechanism **6*e* includes an openable and closable shutter 6*ea*. In addition, the shutter mechanism 6*e* includes a shutter drive unit (not illustrated). The shutter drive unit controls an opening/closing operation of the shutter 6*ea* by driving the shutter 6*ea*. 9001 in FIGS. 9 and 10001 in FIG. 10 illustrate a state where the shutter 6*ea*** is closed.

[Regarding Packaging of Normal Drug MD]

First, referring to FIG. 9, control of the packaging control unit 71 when the drug of the packaging target is the normal drug MD will be described. When the drug of the packaging target is the normal drug MD, the packaging control unit 71 controls the packaging mechanism 6 to repeatedly perform the following operations (i) to (iii) after the last drug out of the plurality of target drugs to be included in one package is fed to the drug feeding port 17. Description that the last drug out of the plurality of target drugs to be included in one package is fed to the drug feeding port 17 means that the last drug out of the plurality of drugs accommodated in a certain sorting cup 141 is fed to the drug feeding port 17. When a certain sorting cup 141 accommodates only one drug, the drug is the last drug.

(i) While the packaging control unit 71 controls the heater roller **6*b* to perform the heat welding on the packaging paper PP, the packaging control unit 71 feeds one package of the packaging paper PP in the direction indicated by the arrow Q1. In this manner, while packaging the normal drugs MD on standby at the standby position Ar4 until all of the normal drugs MD of the current packaging target are fed to the drug feeding port 17, the packaging control unit 71 moves the normal drugs MD from the standby position Ar4 to a welding completed region Ar5. (ii) The packaging control unit 71 opens the shutter 6*ea*, drops all of the normal drugs MD held in the holding region Ar3, and thereafter, closes the shutter 6*ea* again. (iii) After the last normal drug MD out of the target normal drugs MD to be included in the subsequent one package is fed to the drug feeding port 17, the packaging control unit 71 returns to the processing (i). When packaging the normal drug MD to be included in the initial one package, the packaging control unit 71** may start from the processing (ii) without performing the processing (i).

When the above-described processing is performed, as illustrated in FIG. 9, the drug inside the packaging paper PP located at the standby position Ar4 stands by at the standby position Ar4 until another drug to be packaged subsequently to the drug is held on the shutter **6*ea*. Since the standby position Ar4 is a position pinched between the heater rollers 6*b* forming a pair, the drug existing at the standby position Ar4 is likely to be affected by the heat from the heater rollers 6*b*. Therefore, when the drug to of the packaging target is the heating caution drug HMD, the packaging control unit 71** may perform the following control, for example.

[Regarding Packaging of Heating Caution Drug HMD]

Hereinafter, the control of the packaging control unit 71 when the drug of the packaging target is the heating caution drug HMD will be described with reference to FIG. 10. When the drug of the packaging target is the heating caution drug HMD, the packaging control unit 71 controls the packaging mechanism 6 to perform the following operations, after the last drug out of the plurality of target drugs to be included in one package is fed to the drug feeding port 17.

(iv) In a state where the previously packaged heating caution drug HMD is present in the welding completed region Ar5, the packaging control unit 71 controls the heater roller **6*b*. While performing the heat welding on the packaging paper PP, the packaging control unit 71 feeds one package of the packaging paper PP in the direction indicated by the arrow Q1. In this manner, the packaging control unit 71** can set the subsequent one package of the previously packaged heating caution drug HMD as an empty package which does not include the drug.

(v) The packaging control unit 71 opens the shutter **6*ea*, drops all of the heating caution drugs HMD held in the holding region Ar3, and thereafter, closes the shutter 6*ea* again. In this manner, the heating caution drug HMD of the current packaging target is inserted into the packaging paper PP located at the standby position Ar4** and to be prepared as one package subsequent to the empty package.

(vi) While the packaging control unit 71 controls the heater roller **6*b* to perform the heat welding on the packaging paper PP located at the standby position Ar4 and including the heating caution drug HMD, the packaging control unit 71 feeds one package in the direction indicated by the arrow Q1, and moves the heating caution drug HMD to the welding completed region Ar5. In this manner, the heating caution drug HMD inserted into the packaging paper PP at the standby position Ar4 where the heater roller 6*b* exists can be fed from the standby position Ar4 to the welding completed region Ar5 without causing the heating caution drug HMD to stand by at the standby position Ar4. That is, while the target heating caution drug HMD to be included in the subsequent one package is fed from the drug feeding port 17, the heating caution drug HMD of the current packaging target exists in the welding completed region Ar5 instead of the standby position Ar4**.

(vii) In this state, after the last heating caution drug HMD out of the target heating caution drugs HMD to be included in the subsequent one package is fed to the drug feeding port 17, the packaging control unit 71 feeds one package of the packaging paper PP in the direction indicated by the arrow Q1 (that is, returns to the processing (iv)). In this manner, the packaging control unit 71 can set the subsequent one package of the currently packaged heating caution drug HMD as an empty package which does not include the drug, before dropping the subsequent heating caution drug HMD to the standby position Ar4.

When packaging the target heating caution drug HMD to be included in the initial one package, or when packaging the heating caution drug HMD after the normal drug MD is packaged, the packaging control unit 71 may start the processing (v) without performing the processing (iv). In addition, without being limited to one package, the packaging control unit 71 may prepare two or more empty packages, or may prepare an empty package whose dimension is smaller than a dimension of the specified one package (for example, an empty package whose length in the direction indicated by the arrow Q1 is half the length of the specified one package). An empty package or a space which is large enough to allow the packaged heating caution drug HMD to move to a position which is less likely to be affected by the heat of the heater roller 6*b* may be formed between the packaged heating caution drug HMD and the heater roller 6*b* (standby position Ar4). The packaging control unit 71 may move the packaging paper PP in the direction indicated by the arrow Q1 to form the empty package or the space.

As described above, after the heating caution drug HMD is dropped to the standby position Ar4, the packaging control unit 71 feeds at least one package of the packaging paper PP in the direction indicated by the arrow Q1. In this manner, the heating caution drug HMD is packaged and fed to the welding completed region Ar5. Thereafter, after all of the subsequent heating caution drugs HMD are fed to the drug feeding port 17, the packaging control unit 71 feeds at least one package of the packaging paper PP in the direction indicated by the arrow Q1. In this manner, at least the subsequent one package of the previously packaged heating caution drug HMD is prepared as the empty package. Thereafter, the packaging control unit 71 drops the heating caution drug HMD held in the holding region Ar3 to the standby position Ar4. In this manner, the heating caution drug HMD is inserted into the subsequent one empty package.

When the above-described processing is performed, as illustrated in FIG. 10, the packaging paper PP located at the standby position Ar4 is an empty state during a standby time until the drug to be subsequently packaged is held on the shutter 6*ea*. In addition, according to the above-described operation (iv) or (vii) of the packaging mechanism 6, the heat-welded packaging paper PP is dispensed from the packaging mechanism 6, as a packaging sheet including the empty package as illustrated in 11001 in FIG. 11.

After the heating caution drug HMD is dropped to the standby position Ar4, the packaging control unit 71 may feed at least two packages of the packaging paper PP in the direction indicated by the arrow Q1. That is, after the heating caution drug HMD is dropped to the standby position Ar4, the packaging control unit 71 not only may package the heating caution drug HMD, but also may prepare the empty package as the subsequent one package of the packaged heating caution drug HMD. In this case, rather than after all of the subsequent heating caution drugs HMD are fed to the drug feeding port 17, the packaging control unit 71 can prepare the empty package, before all of the subsequent heating caution drugs HMD are fed to the drug feeding port 17, or while all of the subsequent heating caution drugs HMD are fed to the drug feeding port 17. In addition, while the subsequent heating caution drug HMD is fed to the drug feeding port 17, the packaged heating caution drug HMD can stand by at a position further away from the heater roller 6*b* by the amount of the prepared empty package. Therefore, it is possible to further reduce the influence of the heat of the heater roller 6*b* on the packaged heating caution drug HMD.

(Caution when Packaging Heating Caution Drug HMD)

When the heating caution drug HMD is dispensed from the packaging mechanism 6 as the packaging sheet including the empty package as described above, a user may be cautioned by using a print on the empty package. Specifically, as illustrated in 11001 in FIG. 11, in the packaging sheet including the heating caution drug HMD, a printing mechanism (not illustrated) provided in the packaging mechanism 6 may print a specific letter or picture on a portion of the empty package. Specifically, letters such as a "heat countermeasure" or "SKIP", a picture, or a symbol may be printed to recognize as an empty package for the heat countermeasure. Here, it is preferable that a user carefully and visually confirms a color change of the heating caution drug HMD before the heating caution drug HMD is returned to a drug cassette provided in a packaging machine or a drug shelf. This printing enables the user to easily understand that the drug package in front of the empty package displaying the "heat countermeasure" is the heating caution drug HMD. Therefore, this printing can assist the user in the above-described visual confirming work.

(Regarding Cutting Position of Packaging Sheet when Packaging Heating Caution Drug HMD)

A series of packaging sheets welded by the heater roller 6*b* are cut into a predetermined number of packages for subsequent work by a cutting mechanism (not illustrated) of the packaging mechanism 6. The cutting mechanism is controlled by the packaging control unit 71. Both of 11002 and 11003 in FIG. 11 illustrate cutting examples of the packaging sheet when the set number of packages for cutting is set to three. White blank arrow positions in 11002 and 11003 in FIG. 11 are cutting positions.

In a cutting example 1 indicated by 11002 in FIG. 11, the cutting mechanism cuts the packaging sheet every three packages from a top. The packaging sheet cut into the set number of packages will be referred to as a cut unit. In addition, the cutting mechanism cuts the packaging sheet in front of a drug B located at a switching position between the heating caution drug HMD (drug A) and the normal drug MD (drug B). In this case, since the cut unit accommodating the drug A includes the empty package, a position of the drug package accommodating the drug A varies depending on the cut unit.

On the other hand, in a cutting example 2 indicated by 11003 in FIG. 11, the cutting mechanism cuts the packaging sheet every three packages from the top. In addition, when the top of the cut unit is the empty package, the cutting mechanism cuts only the empty package by one package. Furthermore, the cutting mechanism cuts the packaging sheet in front of the drug B located at the switching position between the heating caution drug HMD (drug A) and the normal drug MD (drug B). In this case, the drug packages accommodating the drug A are disposed in both ends, and all of the cut units accommodating the drug A are the same cut unit including the empty package therebetween. Since the packaging sheet is cut as in the cutting example 2, all of the drugs A in the cut unit are disposed in the same manner. Therefore, an appearance of the cut unit dispensed from the packaging mechanism 6 is improved. In addition, it is possible to improve work efficiency of the user during the subsequent visual inspection and/or filling the drug shelf with the drugs.

The cutting example 2 illustrated in 11003 in FIG. 11 can be applied when the set number of packages for cutting is an odd number of five or more. In this case, the same advantageous effect can be obtained as in a case where the above-described set number of packages is three.

Embodiment 3

The drug sorting device 1 of Embodiment 1 discriminates the types of the drugs one by one for all of the drugs accommodated in the first accommodation unit 11, and accommodates the drugs for each type in the second accommodation unit 14. When the first accommodation unit 11 accommodates the types of the drugs whose number exceeds the number of the sorting cups 141 disposed in the second accommodation unit 14, the second accommodation unit 14 cannot accommodate the drugs even when the type is discriminated, and some drugs are accommodated in the standby tray 15. When the drugs are accommodated in the standby tray 15, the drug sorting device 1 discriminates the types of the drugs again, and the second accommodation unit 14 accommodates the drugs. Each time the drug cannot be accommodated in the second accommodation unit 14, the drug sorting device 1 discriminates the type of the drug, and attempts to accommodate the drug in the second accommodation unit 14.

In the present embodiment, a drug dispensing system 100 which can accommodate the drug in the second accommodation unit 14 without causing the drug accommodated in the first accommodation unit 11 to stand by accommodation in the second accommodation unit 14 will be described.

[Drug Dispensing System]

Figure 12:
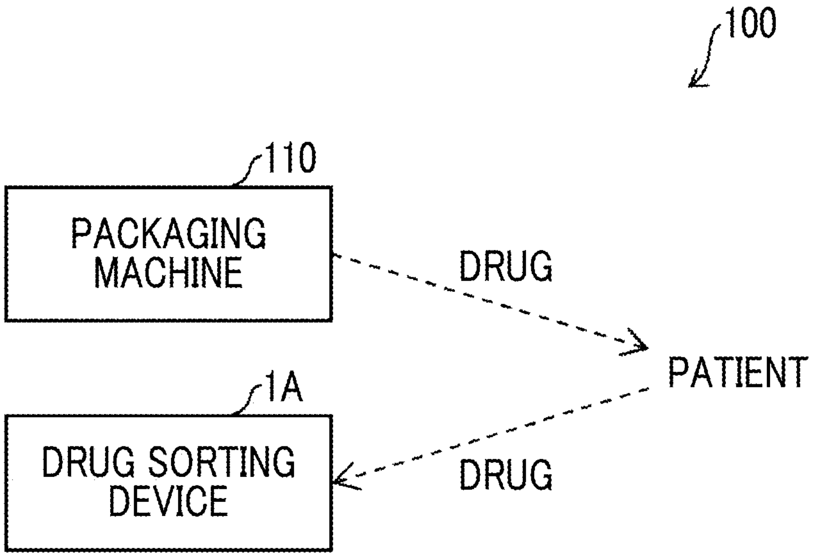
FIG. 12 is a view illustrating a configuration example of a drug dispensing system.
Figure 13:
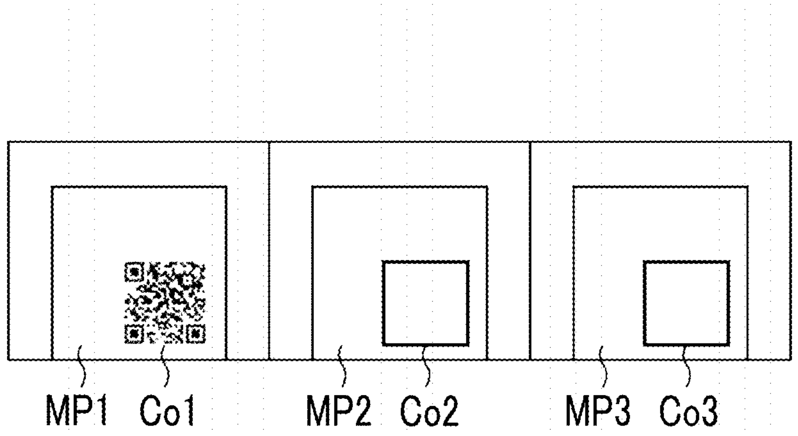
FIG. 13 is a view illustrating a state where a two-dimensional code is printed on a drug package packaged by a packaging machine.

A drug dispensing system 100 of the present embodiment will be described. FIG. 12 is a view illustrating a configuration example of the drug dispensing system 100. FIG. 13 is a view illustrating a state where a two-dimensional code is printed on a drug package packaged by the packaging machine 110.

As illustrated in FIG. 12, the drug dispensing system 100 is a system for dispensing various drugs, based on prescription data, for example, and is a system provided in a medical institution such as a pharmacy or a hospital. For example, the drug dispensing system 100 includes a packaging machine 110 and a drug sorting device 1A.

The packaging machine 110 is a device that dispenses the drugs, based on prescription data, for example. Specifically, the packaging machine 110 is a device that packages the drugs such as tablets or capsules. When packaging the drug, as a two-dimensional code, the packaging machine 110 prints information indicating the type of the drug accommodated on the surface of the packaging paper accommodating the drug. Specifically, as illustrated in FIG. 13, as a two-dimensional code Col, the packaging machine 110 prints the information indicating the type of the drug accommodated in a drug package MP1 on the drug package MP1 in which the drug is packaged in a packaging unit with the packaging paper. As illustrated in FIG. 13, the information indicating the type of the drug accommodated in a drug package MP2 is printed on the drug package MP2, as a two-dimensional code Cot. The Information indicating the type of the drug accommodated in a drug package MP3 is printed on the drug package MP3, as a two-dimensional code Co3.

In the present embodiment, for example, information indicating the type of the drug may be a drug name of the packaged drug or a YJ code. In addition, in the present embodiment, the information indicating the type of the drug is printed on the drug package as a two-dimensional code (for example, QR code (registered trademark)). However, the information may be printed in other forms such as a barcode. The information indicating the type of the drug printed on the drug package is read by the drug sorting device 1A as will be described later. Therefore, the information indicating the type of the drug may be printed on the drug package in a form readable by the drug sorting device 1A.

However, the packaging machine 110 may not necessarily print the information indicating the type of the drug on the packaging paper. For example, the information may be printed by a printing device (not illustrated) that is a separate device from packaging machine 110. In this case, for example, the packaging machine 110 may transmit the information indicating the type of the drug accommodated in the drug package to the printing device. In this manner, the printing device may print the information on the drug package dispensed from the packaging machine 110.

As in the drug sorting device 1, the drug sorting device 1A is a device that sorts the drugs for each type by distinguishing the types of the drugs fed to the drug sorting device 1A. A specific configuration of the drug sorting device 1A will be described later.

In the drug dispensing system 100, the drugs dispensed by the packaging machine 110 are handed over to patients to whom the drugs are prescribed. The drugs handed over to the patient may be returned to a medical institution including the drug dispensing system 100. The returned drugs are fed to the drug sorting device 1A and sorted for each type by a user (for example, a medical worker such as a pharmacist) to be returned to the packaging machine 110 or the drug shelf (not illustrated).

[Drug Sorting Device]

Figure 14:
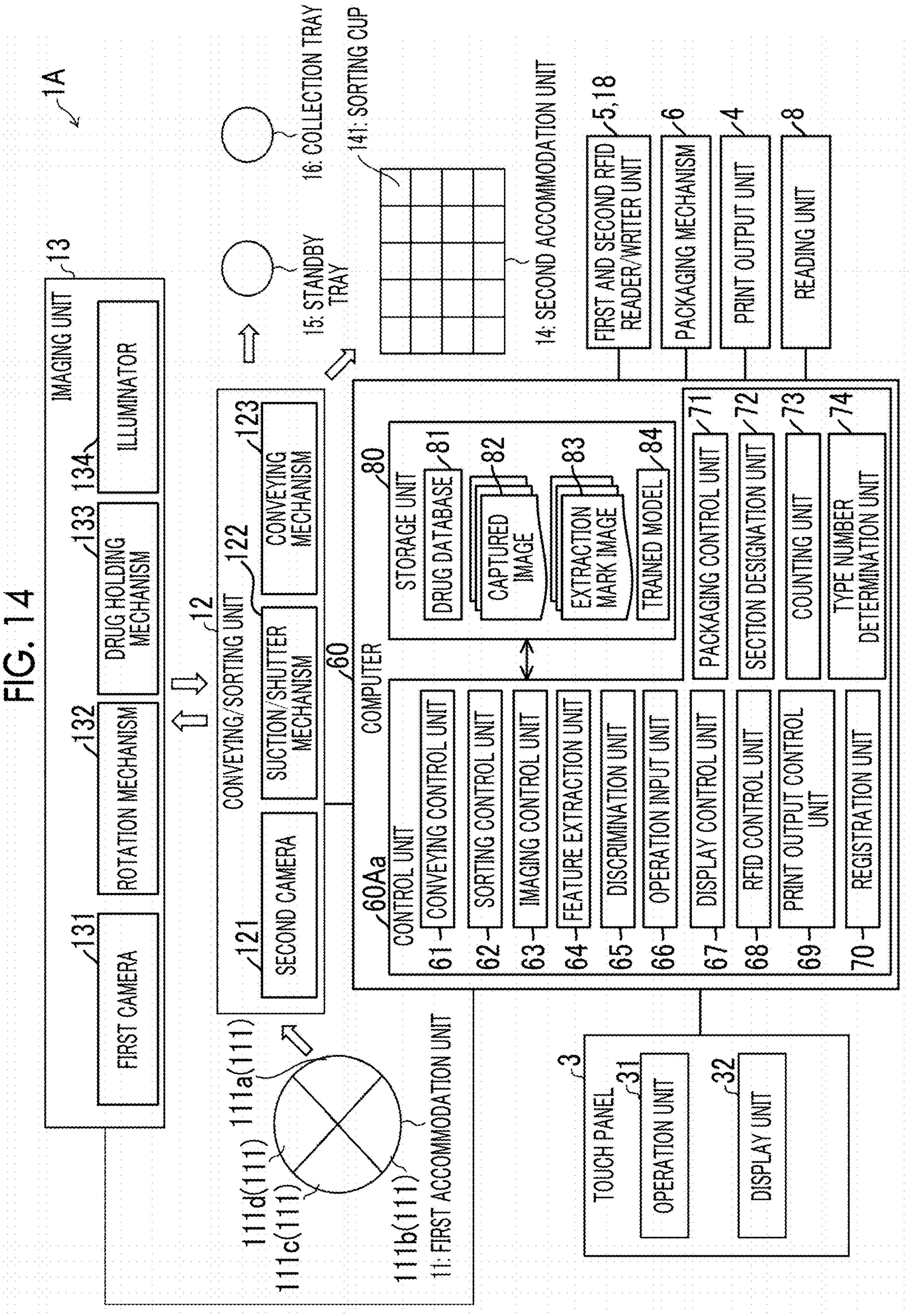
FIG. 14 is a block diagram illustrating an overall configuration of the drug sorting device.

FIG. 14 is a block diagram illustrating an overall configuration of the drug sorting device 1A. As illustrated in FIG. 14, the drug sorting device 1A includes a reading unit 8 and a control unit 60Aa in addition to the configuration of the drug sorting device 1. Hereinafter, in addition to these members, the first accommodation unit 11, the second accommodation unit 14, the conveying/sorting unit 12, the packaging mechanism 6, and the display unit 32 of the touch panel 3 will also be described.

As described in Embodiment 1, the first accommodation unit 11 is an accommodation unit that can accommodate a plurality of types of drugs, and is divided into a plurality of accommodation units (specifically, four accommodation units). In the present embodiment, the four accommodation units divided in the first accommodation unit 11 will be respectively referred to as first sections 111*a* to 111*d*. The first sections 111*a* to 111*d* may be collectively referred to as a first section 111 in some cases. The number of first sections 111 may be other than four as long as the number is two or more. In addition, as described above, the first accommodation unit 11 can accommodate the drugs packaged by the packaging machine 110.

As described in Embodiment 1, the second accommodation unit 14 is an accommodation unit in which a plurality of sorting cups 141 can be disposed, and each of the plurality of disposed sorting cups 141 can accommodate the drugs for each type. Instead of the removable sorting cup 141, the second accommodation unit 14 may be provided with a plurality of sections which can accommodate the drugs. The sorting cup 141 and the sections can also be referred to as second sections which can accommodate the drugs for each type. In the present embodiment, the total number (number of the second sections. Hereinafter, also simply referred to as the total number of the sorting cups 141) of the sorting cups 141 which can be accommodated in the second accommodation unit 14 is 40, but the number is not limited thereto as long as the number is two or more.

The conveying/sorting unit 12 functions as a conveying unit that conveys the drugs accommodated in the first accommodation unit 11 to the second accommodation unit 14 for each of the first sections 111, and accommodates the drugs in the sorting cups 141 for each type in the second accommodation unit 14.

The conveying/sorting unit 12 conveys all of the drugs accommodated in one of the first sections 111 (for example, the first section 111*a*) to the second accommodation unit 14 or the standby tray 15, based on the discrimination result of the discrimination unit 65. The conveying/sorting unit 12 causes each of the sorting cups 141 of the second accommodation unit 14 to accommodate the drugs whose types are discriminated. The conveying/sorting unit 12 causes the standby tray 15 to accommodate the drugs whose types are not discriminated.

After the sorting processing is completely performed on all of the drugs accommodated in one of the first sections 111, the conveying/sorting unit 12 conveys all of the drugs accommodated in the sorting cups 141 of the second accommodation unit 14 to the packaging mechanism 6. Thereafter, the conveying/sorting unit 12 starts to convey the drug accommodated in another first section 111 (for example, the first section 111*b*) to the second accommodation unit 14. In this manner, the drugs accommodated in the first section 111 can be conveyed to the second accommodation unit 14 in a state where the second accommodation unit 14 is empty.

The conveying/sorting unit 12 performs the above-described conveying processing until the drugs are fetched from all the first sections 111. That is, in the present embodiment, after the sorting processing is completely performed on the drugs accommodated in the first section 111*a* and the packaging processing is completely performed on the drugs accommodated in the second accommodation unit 14, the sorting processing starts for the drugs accommodated in the first section 111*b*. Thereafter, the sorting processing is completely performed on the drugs accommodated in the first section 111*b*, and after the packaging processing is completely performed on the drugs accommodated in the second accommodation unit 14, the sorting processing starts for the drugs accommodated in the first section 111*c*. Thereafter, the sorting processing is completely performed on the drugs accommodated in the first section 111*c*, and after the packaging processing is completely performed on the drugs accommodated in the second accommodation unit 14, the sorting processing starts for the drugs accommodated in the first section 111*d*.

As described in Embodiment 1, the packaging mechanism 6 functions as a packaging unit that packages the drugs accommodated in the second accommodation unit 14. After all of the drugs accommodated in one of the first sections 111 are conveyed to the second accommodation unit 14 or the standby tray 15, the conveying/sorting unit 12 conveys the drugs accommodated in the second accommodation unit 14 to the drug feeding port 17. Thereafter, the packaging mechanism 6 starts to package the drugs accommodated in the sorting cups 141 of the second accommodation unit 14. In this manner, even when all of the sorting cups 141 accommodate the drugs, the drug sorting device 1A can prepare an empty space in the sorting cups 141 by packaging the drugs. Therefore, the drug sorting device 1A can convey the drug of the subsequent sorting target to the second accommodation unit 14.

The reading unit 8 reads information indicating the type of the drug accommodated in the first accommodation unit 11. In the present embodiment, the reading unit 8 reads a two-dimensional code printed on the drug package. Specifically, the user causes the reading unit 8 to read the two-dimensional code printed on the drug package before the drug accommodated in the drug package is fed to the first accommodation unit 11. The reading unit 8 may be configured in any way as long as the reading unit 8 can read the information indicating the type of the drug accommodated in the drug package. For example, when a form printed on the drug package is a barcode, the reading unit 8 may be a barcode reader.

The display unit 32 notifies a user to accommodate the drug in the first section 111 designated as an accommodation destination of the drug by a section designation unit 72 (to be described later). In this manner, the drug sorting device 1A enables the user to accommodate the drug in the designated first section 111. In addition, the display unit 32 functions as a notification unit that notifies the user to change the first section 111 serving as the accommodation destination of the drug, each time the total type number of the drugs counted by a counting unit 73 (to be described later) reaches the total number (40 in the present embodiment) of the sorting cups 141.

The display unit 32 may not necessarily give a notification for accommodating the drug in the designated first section 111. For example, the notification may be given by a voice output unit (not illustrated) that outputs a voice. That is, the drug sorting device 1A only needs to have a notification unit that notifies the user of various information.

In addition, after the sorting processing is completely performed on all of the drugs accommodated in one first section 111, the packaging mechanism 6 may not package the drugs. In this case, after the sorting processing is completely performed, the display unit 32 may notify the user to replace the sorting cup 141 with a new sorting cup 141 accommodating no drug. In addition, the display unit 32 may notify the user to bring the sorting cups 141 disposed in the second accommodation unit 14 into an empty state. Even in this case, an empty space can be prepared in the sorting cup 141 before the drug accommodated in the subsequent first section 111 is conveyed to the second accommodation unit 14.

For example, in addition to the configuration of the control unit 60*a*, the control unit 60Aa further includes the section designation unit 72, the counting unit 73, and a type number determination unit 74.

The section designation unit 72 designates one of the first sections 111*a* to 111*d*, as the first section 111 serving as the accommodation destination of the drug. Each time the type number determination unit 74 determines that the total number of type numbers of the drugs counted by the counting unit 73 (total type number of the drugs) exceeds the total number of the sorting cups 141, the section designation unit 72 changes the designated first section 111.

The first section 111 designated by the section designation unit 72 as an initial position when the sorting processing of the drug starts, and a designation order of the first sections 111 designated by the section designation unit 72 are set in advance. Therefore, each time the section designation unit 72 determines that the total type number of the drugs counted by the counting unit 73 exceeds the total number of the sorting cups 141, the section designation unit 72 changes the first section 111 serving as the accommodation destination for the drug in accordance with the designation order set in advance. For example, each time a determination result is received from the type number determination unit 74, the section designation unit 72 transmits information indicating the designated first section 111 to the display control unit 67.

For example, the first section 111*a* is set as the initial position of the accommodation destination of the drug, and the designation order of the first sections 111 is set in the order of the first section 111*a*, the first section 111*b*, the first section 111*c*, and the first section 111*d*. In this case, in the present embodiment, when the drug sorting processing starts, the section designation unit 72 designates the first section 111*a* as the accommodation destination of the drug. As a result, the display control unit 67 causes the display unit 32 to display an image for notifying the user to accommodate the drug in the first section 111*a*. Thereafter, each time it is determined that the total type number of the drugs counted by the counting unit 73 reaches the total number of the sorting cups 141, the section designation unit 72 changes the accommodation destinations of the drug in the order of the first section 111*b*, the first section 111*c*, and the first section 111*d*. As a result, the display control unit 67 causes the display unit 32 to sequentially display (i) an image for notifying the user to accommodate the drug in the first section 111*b*, (ii) an image for notifying the user to accommodate the drug in the first section 111*c*, and (iii) an image for notifying the user to accommodate the drug in the first section 111*d*.

The counting unit 73 counts the type number of the drugs accommodated in the first accommodation unit 11, based on the two-dimensional code read by the reading unit 8. When the reading unit 8 reads the two-dimensional code printed on the drug package, the reading unit 8 transmits a reading result thereof (information indicating the type of the drug indicated by the two-dimensional code) to the counting unit 73. The counting unit 73 counts the type number of the drugs accommodated in the drug package by analyzing the reading result. That is, since the two-dimensional code is printed on the drug package, the counting unit 73 can count the type number of the drugs accommodated in the drug package.

As described above, the user causes the reading unit 8 to read the two-dimensional code printed on the drug package, before the drugs accommodated in the drug package are fed to the first accommodation unit 11. Therefore, the counting unit 73 can count the type number of the drugs to be accommodated in the first accommodation unit 11 from now on by counting the type number of the drugs accommodated in the drug package.

However, when the drug whose type coincides with the type of the previously counted drug is included in the types of the drugs indicated by the acquired two-dimensional code, the counting unit 73 excludes the coincident drug from a counting target. For example, a case is conceivable in which the drugs to be accommodated from now on are drugs ME to MG, and the previously counted drugs (drugs accommodated in one of the first sections 111) are drugs MA to MF. In this case, the counting unit 73 excludes the drugs ME and MF out of three types of the drugs ME to MG from the counting target, and counts the type number of the drugs to be accommodated from now on, as one type.

The counting unit 73 updates the total type number of the drugs by adding the type number of the currently counted drugs to the total type number of the drugs counted so far (total type number). The counting unit 73 updates the total type number of the drugs until the counting unit 73 receives a reset instruction to reset the total type number of the drugs from the type number determination unit 74. The counting unit 73 transmits information indicating the updated total type number of the drugs to the type number determination unit 74. The counting unit 73 temporarily stores the total type number of the drugs.

The type number determination unit 74 determines whether the total type number of the drugs indicated by the information received from the counting unit 73 reaches the total number of the sorting cups 141. The type number determination unit 74 transmits the determination result to the section designation unit 72. In this manner, the section designation unit 72 can determine whether or not the first section 111 needs to be changed.

In Embodiment 1, with regard to at least the mark of the drug, the drug sorting device 1 discriminates the type of the drug by using the extraction mark image 83 obtained by inputting the captured image 82 to the trained model 84. However, in the present embodiment, the drug sorting device 1A may extract the mark of the drug from the captured image 82 by using the existing image processing without using the trained model 84.

[Processing when Accommodating Drug in First Accommodation Unit]

Figure 15:
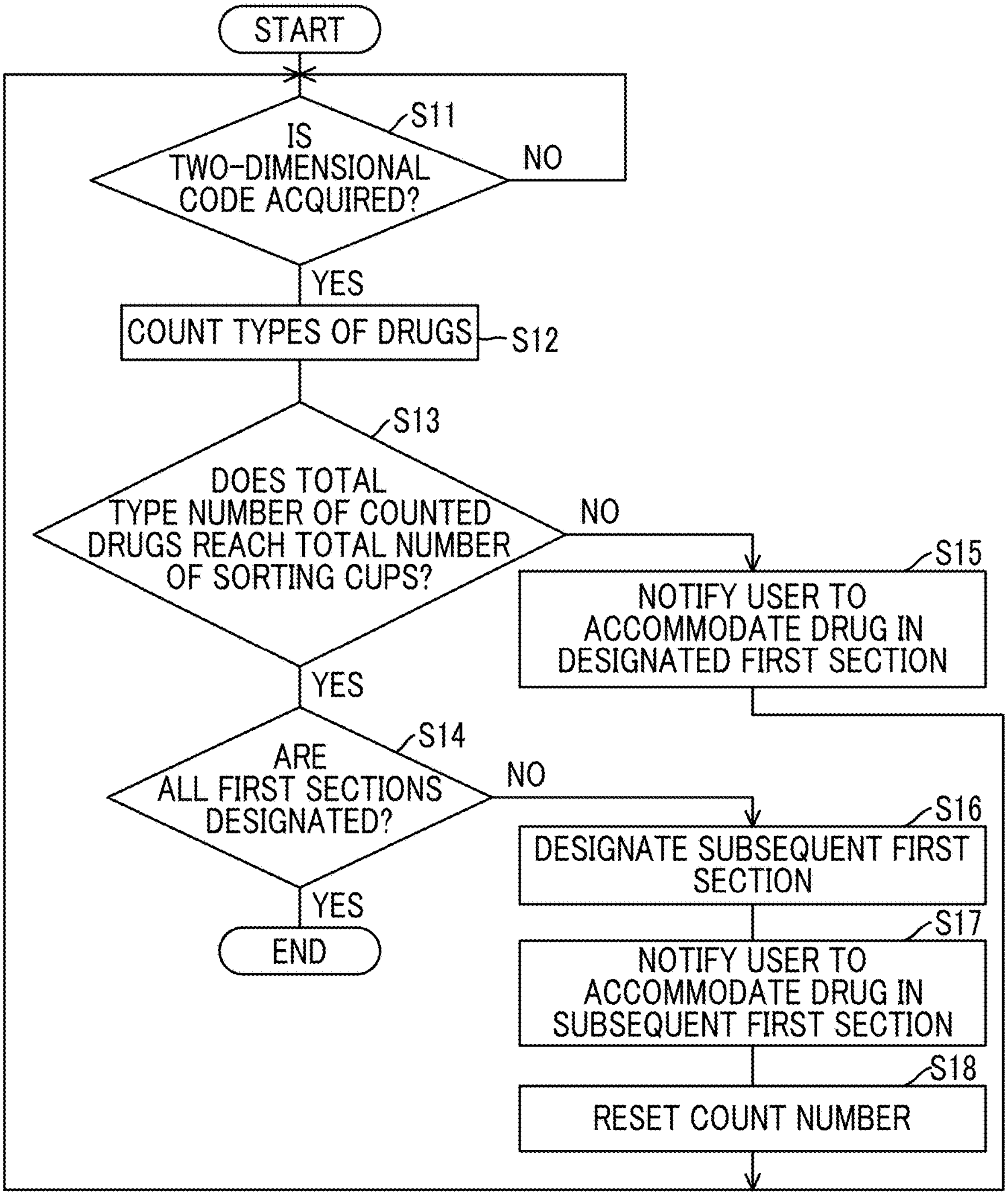
FIG. 15 is a flowchart illustrating an example of a flow of processing when a drug is fed into a first accommodation unit.

Next, an example of processing when the drug is fed to the first accommodation unit 11 will be described with reference to FIG. 15. FIG. 15 is a flowchart illustrating an example of a flow of the processing. In this example, it is assumed that the first section 111*a* is designated as the accommodation destination of the drug when the drug sorting processing starts. In addition, it is assumed that the accommodation destination of the drug is changed in the order of the first section 111*a*, the first section 111*b*, the first section 111*c*, and the first section 111*d*.

In a state where the first section 111*a* is designated as the accommodation destination of the drug, the control unit 60Aa determines whether or not the reading unit 8 reads the two-dimensional code printed on the drug package. That is, the control unit 60Aa determines whether or not the two-dimensional code read by the reading unit 8 is acquired from the reading unit 8 (S11).

The user causes the reading unit 8 to read the two-dimensional code printed on the drug package, before the drug accommodated in the drug package is fed to the first accommodation unit 11. When the user causes the reading unit 8 to read the two-dimensional code, the control unit 60Aa acquires the two-dimensional code from the reading unit 8. The display control unit 67 may cause the display unit 32 to display an image prompting the user so that the reading unit 8 reads the two-dimensional code printed on the drug package, before the drug accommodated in the drug package is fed to the first accommodation unit 11.

When the control unit 60Aa determines that the two-dimensional code is acquired (YES in S11), the counting unit 73 counts the type number of the drugs accommodated in the drug package, based on the information indicating the type of the drug indicated by the acquired two-dimensional code (S12). That is, the counting unit 73 counts the type number of the drugs to be accommodated in the first accommodation unit 11 from now on. Thereafter, the counting unit 73 updates the total type number of the drugs by adding the type number of the currently counted drugs to the total type number of the temporarily stored drugs. The control unit 60Aa performs the processing in S11 until the two-dimensional code is read by the reading unit 8 and the two-dimensional code is acquired from the reading unit 8 (case of NO in S11).

The type number determination unit 74 determines whether or not the total type number of the drugs received from the counting unit 73 (total type number of the drug after being updated) reaches the total number of the sorting cups 141 (S13).

A case is conceivable where the type number determination unit 74 determines that the total type number of the drugs does not reach the total number of the sorting cups 141 (NO in S13). In this case, the display control unit 67 causes the display unit 32 to display an image for notifying the user to accommodate the drug in the first section 111 currently designated by the section designation unit 72 (S15). When the section designation unit 72 designates the first section 111*a* during the processing in S15, the display control unit 67 notifies the first section 111*a* to accommodate the drug. After the processing of S15, the processing returns to S11.

On the other hand, when the type number determination unit 74 determines that the total type number of the drugs reaches the total number of the sorting cups 141 (YES in S13), the section designation unit 72 determines whether or not all of the first sections 111*a* to 111*d* are designated (S14). In the present embodiment, the section designation unit 72 determines whether or not the first section 111*d* is designated.

When the section designation unit 72 determines that all of the first sections 111*a* to 111*d* are not designated (NO in S14), the section designation unit 72 changes the currently designated first section 111 to the first section 111 set as the accommodation destination of the subsequent drug. That is, the section designation unit 72 designates the first section 111 as the accommodation destination of the subsequent drug (S16). The display control unit 67 causes the display unit 32 to display an image for notifying the user to accommodate the drug in the first section 111 serving as the accommodation destination of the subsequent drug which is designated by the section designation unit 72 (S17).

In the present embodiment, when any one of the first sections 111*a* to 111*c* is designated, the section designation unit 72 designates any one of the first sections 111*b* to 111*d* serving as the accommodation destination of the subsequent drug. For example, when the section designation unit 72 designates the first section 111*a* as the accommodation destination of the drug, the first section 111*b* is designated as the accommodation destination of the subsequent drug. The display control unit 67 causes the display unit 32 to display an image for notifying the user to accommodate the drug in the first section 111*b*.

Thereafter, the control unit 60Aa resets the total type number of the drug temporarily stored in the counting unit 73 (S18). In this manner, the counting unit 73 counts the total type number of the drugs accommodated in the newly designated first section 111. After the processing of S18, the processing returns to S11.

On the other hand, when the section designation unit 72 determines that all of the first sections 111*a* to 111*d* are designated (YES in S14), the control unit 60Aa completes this processing. In the present embodiment, in a state where the section designation unit 72 designates the first section 111*d*, the control unit 60Aa completes this processing. In this manner, it is possible to prevent a possibility that the drugs exceeding the total number of the sorting cups 141 may be accommodated in the first section 111*d*.

The configuration is not limited to a case where the drugs are accommodated in all of the first sections 111*a* to 111*d*. That is, the configuration is not limited to a case where the drugs whose type number exceeds 160 types are accommodated in the first accommodation unit 11. Therefore, when the control unit 60Aa receives a user input to start the sorting processing of the drugs, the control unit 60Aa may complete this processing on an assumption that the drugs to be accommodated in the first accommodation unit 11 do not exist. For example, when the type number of the drugs accommodated in the first accommodation unit 11 is equal to or less than 40 types, this processing is completed in a state where the drugs are accommodated only in the first section 111*a*.

In this way, even when the type number of the drugs to be accommodated in the first accommodation unit 11 from now on is added to the total type number of the drugs accommodated in the designated first section 111, and when the total type number of the drugs does not exceed the total number of the sorting cups 141, the control unit can accommodate the drugs in the first section 111. That is, the control unit 60Aa can prompt the user to accommodate the drugs in the first section 111 until the number of the drugs accommodated in the first section 111 reaches the total number of the sorting cups 141. On the other hand, in a case where the total type number of the drugs exceeds the total number of sorting cups 141 when the type number of the drugs is added to the total type number of the drugs, the control unit 60Aa can accommodate the drugs in another first section 111 (first section 111 in which no drug is accommodated). Therefore, the control unit 60Aa can accommodate as many types as possible in the first section 111 without exceeding the total number of the sorting cups 141.

Here, the following case is conceivable. The drugs having the same type as the drugs to be accommodated in the first accommodation unit 11 are previously accommodated in the first section 111 different from the first section 111 designated as the accommodation destination of the drug. In this case, the section designation unit 72 may designate the first section 111 in which the same type of the drug is previously accommodated, as the accommodation destination of the drug to be accommodated in the first accommodation unit 11.

For example, after the two-dimensional code is acquired in S11, the control unit 60Aa determines whether or not the type of the drug indicated by the two-dimensional code coincides with the type of the drug accommodated in any one of the first sections 111 designated so far. When the control unit 60Aa determines that the types of the two drugs coincide with each other, the section designation unit 72 specifies the first section 111 accommodating the same type of the drug as the type of the drug indicated by the two-dimensional code, and designates the first section 111 as the accommodation destination of the drug. The display control unit 67 notifies the first section 111 to accommodate the drug, via the display unit 32. On the other hand, when the control unit 60Aa determines that the types of the two drugs do not coincide with each other, the counting unit 73 counts the types of the drugs in S12.

[Drug Sorting Processing]

Figure 16:
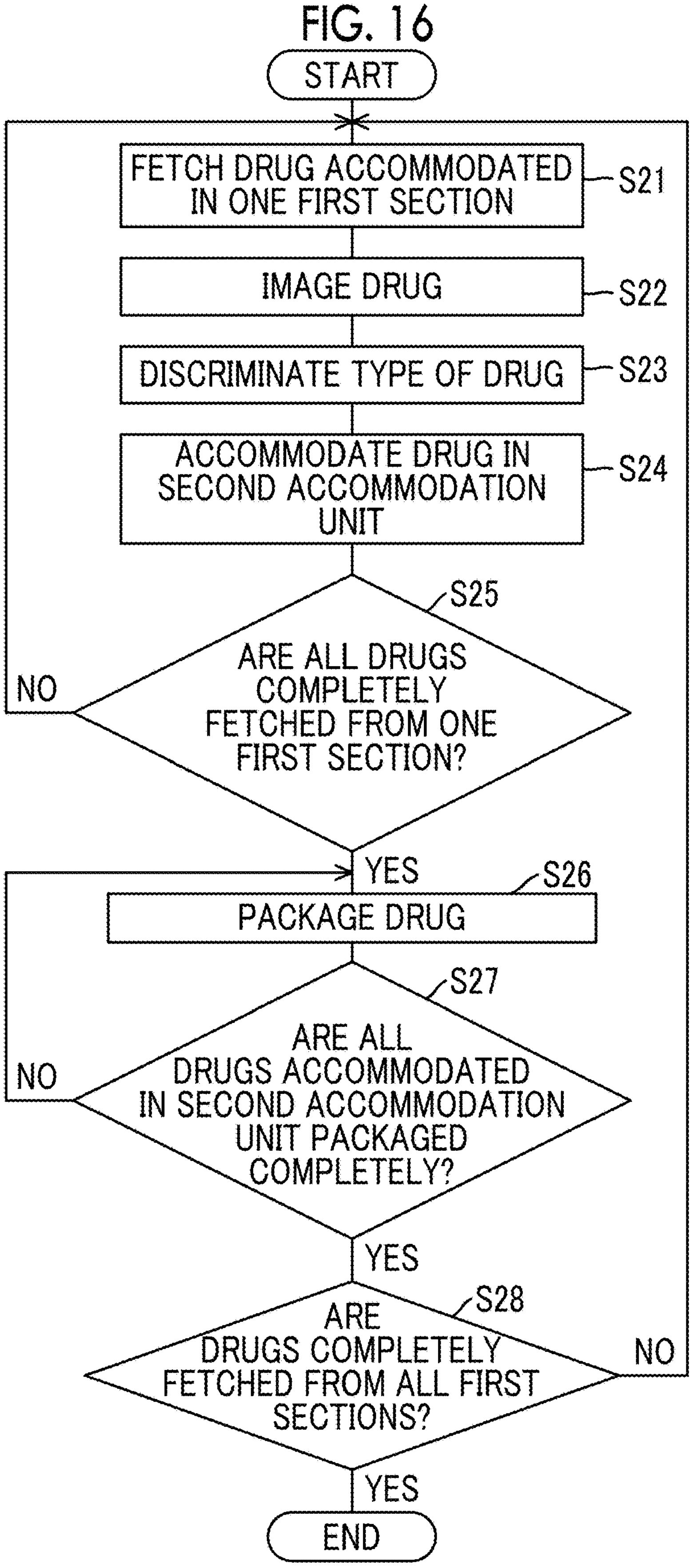
FIG. 16 is a flowchart illustrating an example of a flow of drug sorting processing.

Next, drug sorting processing performed after the drugs are accommodated in the first accommodation unit 11 will be described with reference to FIG. 16. FIG. 16 is a flowchart illustrating an example of a flow of the drug sorting processing. For example, this drug sorting processing may be performed by the control unit 60Aa, when a user input for starting the drug sorting processing is received. In addition, in this example, the drugs accommodated in the first section 111 are fetched in the order of the first section 111*a*, the first section 111*b*, the first section 111*c*, and the first section 111*d*, are conveyed to the second accommodation unit 14, and are accommodated in the sorting cup 141 for each type.

The conveying control unit 61 controls the conveying/sorting unit 12 to fetch one drug accommodated in one first section 111 specified as a fetching target of the drug (S21). The imaging control unit 63 controls the first camera 131 to image the drug fetched by the conveying/sorting unit 12 (S22). The discrimination unit discriminates the type of the drug, based on an image of the drug imaged by the first camera 131 (S23). The sorting control unit 62 determines the sorting cups 141 (sorting positions) for accommodating the drug whose type is discriminated. The sorting control unit 62 controls the conveying/sorting unit 12 to accommodate the drug in the sorting cups 141 determined as the accommodation destination of the drug (S24).

The conveying control unit 61 determines whether all of the drugs are completely fetched from the first section 111 serving as the fetching target of the drug (S25). When the conveying/sorting unit 12 fetches the drugs from the first section 111, the imaging control unit 63 controls the second camera 121 to image the first section 111 serving as the fetching target of the drug. The imaging control unit 63 analyzes the image of the first section 111 imaged by the second camera 121 to determine whether or not the drug is accommodated in the first section 111 serving as the fetching target of the drug. When the imaging control unit 63 determines that the first section 111 does not accommodate the drug, the conveying control unit 61 determines that all of the drugs are fetched from the first section 111 serving as the fetching target of the drug.

When it is determined that all of the drugs are not fetched from the first section 111 serving as the fetching target of the drug (NO in S25), the conveying control unit 61 performs the processing in S21 since the drugs are still accommodated in the first section 111. On the other hand, when the conveying control unit 61 determines that all of the drugs are fetched from the first section 111 (YES in S25), the conveying control unit 61 and the sorting control unit 62 temporarily suspend the conveying and sorting processing of the drugs. That is, the conveying control unit 61 does not perform the conveying processing of the drug accommodated in the first section 111 accommodating the drug of the subsequent sorting target.

Instead, the packaging control unit 71 controls the conveying/sorting unit 12 to convey the drug accommodated in the sorting cup 141 to the drug feeding port 17. Thereafter, the packaging control unit 71 controls the packaging mechanism 6 to package the drug accommodated in the sorting cup 141 (S26). The packaging control unit 71 performs the processing in S26 for all of the sorting cups 141 accommodating the drugs.

For example, the sorting cup 141 accommodating the drug can be specified in such a manner that a sorting position determined by the sorting control unit 62 is stored in the storage unit 80. In addition, for example, whether or not the sorting cup 141 accommodates the drug may be determined in such a manner that imaging control unit 63 causes the second camera 121 to image the sorting cup 141 and analyzes the image of the sorting cup 141.

The packaging control unit 71 determines whether or not all of the drugs accommodated in the second accommodation unit 14 are packaged (S27). That is, the packaging control unit 71 determines whether or not all of the drugs accommodated in the sorting cups 141 are packaged for all of the sorting cups 141 accommodating the drugs.

The packaging control unit 71 performs the processing in S26 until all of the drugs accommodated in the second accommodation unit 14 are packaged (NO in S27). On the other hand, when it is discriminated that all of the drugs accommodated in the second accommodation unit 14 are packaged (YES in S27), the conveying control unit 61 determines whether or not the drugs are completely fetched from all of the first sections 111 accommodating the drugs (S28).

When the conveying control unit 61 determines that the drugs are not completely fetched from all of the first sections 111 accommodating the drugs (NO in S28), the processing returns to S21. That is, in this case, the control unit 60Aa can restart the sorting processing of the drugs accommodated in the first section 111 by fetching the drugs from the first section 111 serving as the fetching target of the drug. On the other hand, when the conveying control unit 61 determines that the drugs are completely fetched from all of the first sections 111 accommodating the drugs (YES in S28), the control unit completes this drug sorting processing.

For example, the control unit 60Aa manages the first section 111 designated by the section designation unit 72. In this manner, the conveying control unit 61 can perform the processing in S28. For example, when the last first section 111 designated by the section designation unit 72 is the first section 111*c*, the conveying control unit 61 determines in S28 whether or not the drugs are completely fetched from the first section 111*c*. For example, when the packaging processing is completely performed on all of the drugs accommodated in the first section 111*a*, the conveying control unit 61 determines that the drugs are not completely fetched from the first section 111*c*. In this case, in S21, the conveying control unit 61 specifies the first section 111*b* as the fetching target of the subsequent drug, and fetches the drug from the first section 111*b*. Thereafter, when the packaging processing is completely performed on all of the drugs accommodated in the first section 111*c*, the control unit 60Aa completes this drug sorting processing.

In this way, the control unit 60Aa causes the second accommodation unit 14 to accommodate all of the drugs accommodated in one of the first sections 111 and whose types are discriminated. The control unit 60Aa packages all of the drugs accommodated in the second accommodation unit 14, brings all of the sorting cups 141 into an empty state, and thereafter, starts to perform the sorting processing on the drug accommodated in another first sections 111. As described above, the first section 111 accommodates the drugs whose type numbers are equal to or less than the total number of the sorting cups 141. Therefore, the control unit 60Aa can accommodate all of the drugs in the second accommodation unit 14 without conveying the drugs whose types are discriminated to the standby tray 15.

In the present embodiment, the control unit 60Aa performs the packaging processing in S26 to bring all of the sorting cups 141 into an empty state. However, the present invention is not limited thereto. That is, the control unit 60Aa may perform the following processing instead of the processing in S26 and S27. For example, the control unit 60Aa may prompt the user to replace the sorting cup 141 with the new sorting cup 141 accommodating no drug. In addition, the control unit 60Aa may prompt the user to bring the sorting cups 141 disposed in the second accommodation unit 14 into an empty state. Thereafter, when a user input indicating that the sorting cup 141 is in the empty state is received, the control unit 60Aa may perform the processing in S28.

In addition, when the conveying control unit 61 determines that all of the drugs are completely fetched from the first section 111 (YES in S25), the section designation unit 72 may designate the first section 111 as the accommodation destination of the drug. The display control unit 67 may notify the user to accommodate the drug in the first section 111. In this case, even in a state where the sorting processing is not completely performed on the drugs accommodated in the subsequent first section 111, the drugs can be accommodated in the first section 111 brought into the empty state.

[Main Advantageous Effects of Present Embodiment]

As described above, the drug sorting device 1A in the present embodiment notifies the user to change the first section 111 serving as the accommodation destination of the drug, each time the total type number of the drugs counted by the counting unit 73 reaches the total number of the sorting cups 141. Therefore, one of the first sections 111 can accommodate the drugs whose type numbers are equal to or less than the total number of the sorting cups 141.

The drug sorting device 1A conveys the drugs accommodated in the first accommodation unit 11 to the second accommodation unit 14 for each of the first sections 111, and sorts the drugs for each type in the second accommodation unit 14. Therefore, in one sorting processing, the drugs whose type numbers exceed the number of types which can be accommodated in the second accommodation unit 14 are not the sorting targets. Therefore, the drug sorting device 1A can accommodate the drugs whose types are discriminated in the second accommodation unit 14 for each type without causing the drugs to stand by at the standby position (for example, the standby tray 15) different from the second accommodation unit 14. That is, the drug sorting device 1A can shorten a time required for the drug sorting processing by the amount of the processing time required when the drugs whose types are discriminated are caused to stand by at the standby position.

Embodiment 4

In the drug sorting device 1 of Embodiment 1, the imaging control unit 63 causes the second camera 121 to image the inside of the sorting cup 141 when the drugs are fetched from the sorting cup 141. The packaging control unit 71 specifies the drug serving as the fetching target from the captured image of the inside of the sorting cup 141, and moves the suction mechanism of the suction/shutter mechanism 122 in a vertically downward direction (−Z-axis direction).

However, the imaging control unit 63 performs imaging only once in a plane. Therefore, there is a possibility that the imaging control unit 63 may specify a lower side drug partially superimposed and accommodated in the sorting cup 141 from the above-described image, as the drug serving as the fetching target. In this case, when the suction mechanism fetches the lower side drug, there is a possibility that an upper side drug may be flown out from the sorting cup 141.

In addition, there is a possibility that the suction mechanism may push an end side of the drug in a vertically upward direction (+Z-axis direction) when the drug is suctioned. In this case, there is a possibility that the drug may be flown out from the sorting cup 141. In order to reduce this possibility, the packaging control unit 71 reduces a lowering speed of the suction mechanism when the suction mechanism is moved in the vertically downward direction. However, the packaging control unit 71 uniformly reduces the lowering speed of the suction mechanism from a predetermined fixed position regardless of the amount of the drugs accommodated in the sorting cup 141. Therefore, there is a possibility that a fetching speed of the drug from the sorting cup 141 may be reduced regardless of the amount of the drugs accommodated in the sorting cup 141.

Therefore, in the present embodiment, when the drug is fetched from the sorting cup 141, the inside of the sorting cup 141 is imaged by the second camera 121 from a plurality of positions. In this manner, the present embodiment reduces a possibility that the lower side drug may be fetched first, and a possibility that the fetching speed may be reduced.

Figure 17:
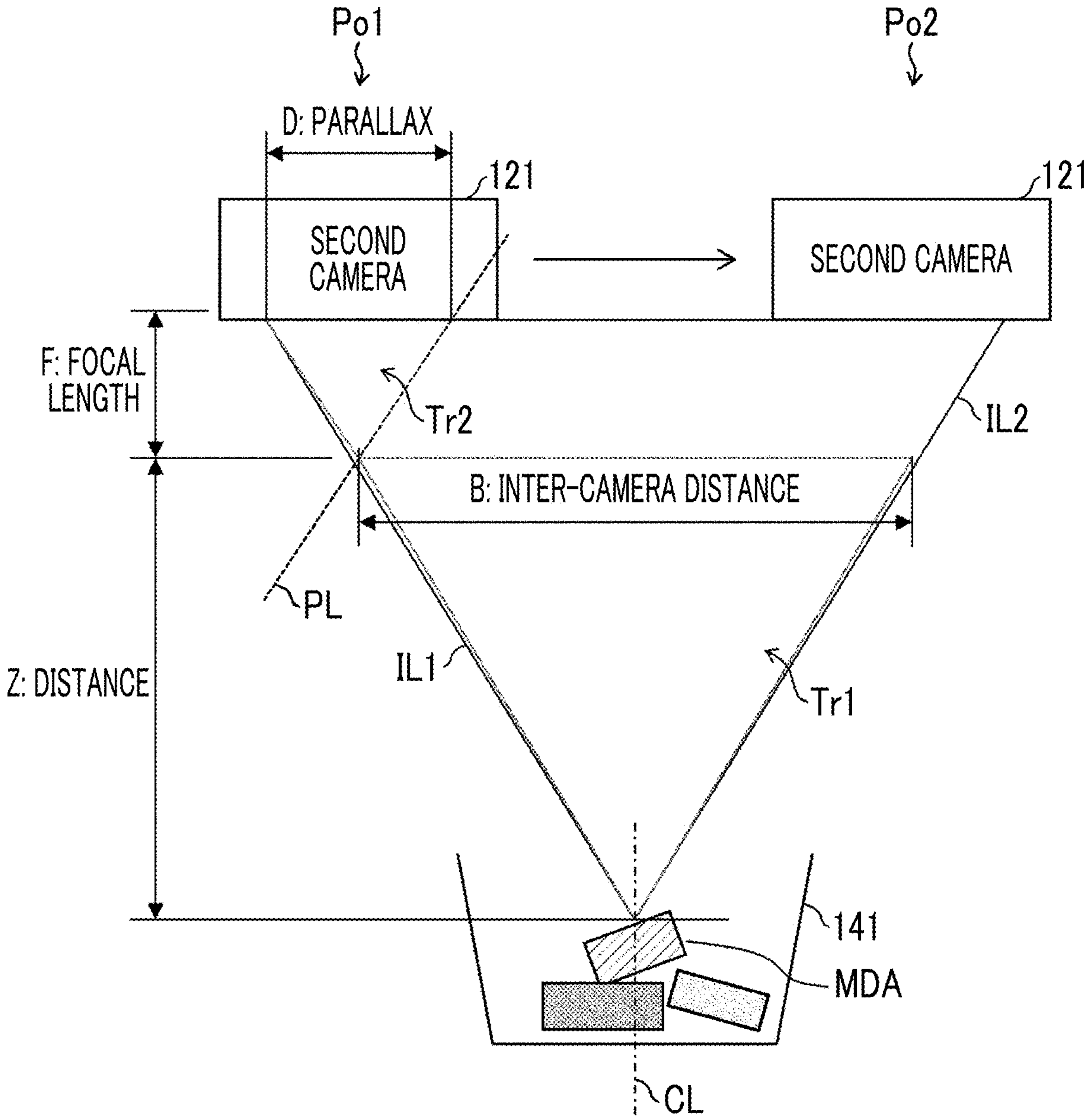
FIG. 17 is a view for describing a method for imaging an inside of a sorting cup.

FIG. 17 is a view for describing a method for imaging the inside of the sorting cup 141. As illustrated in FIG. 17, the control unit 60*a* moves the second camera 121 to a first position Po1 located at a predetermined distance away from a center line CL of the sorting cup 141 for fetching the drugs. The imaging control unit 63 images the inside of the sorting cup 141 at the first position Po1. Next, the control unit 60*a* moves the second camera 121 from the first position Po1 to a second position Po2 located at a predetermined distance away from the center line CL. The imaging control unit 63 images the inside of the sorting cup 141 at the second position Po2. The second camera 121 may image the inside of the sorting cup 141 at the first position Po1 after capturing the image at the second position Po2. In addition, the second camera 121 actually moves together with the suction/shutter mechanism 122.

Based on a first image acquired at the first position Po1 and a second image acquired at the second position Po2, the control unit 60*a* calculates a parallax D which is a difference in image positions between the first image and the second image. A method for calculating the parallax D can adopt a known technique.

Here, a principle of distance measurement using the parallax will be described. As illustrated in FIG. 17, a first triangle Tr1 is formed by (i) incident light IL1 from an object on the second camera 121 existing at the first position Po1, (ii) incident light IL2 from the object on the second camera 121 existing at the second position Po2, and (iii) an inter-camera distance B. In addition, a second triangle Tr2 is formed by (i) the incident light IL1, (ii) a straight line PL which is a parallel line of the incident light IL2 and passes through a focal position of a lens (not illustrated) included in the second camera 121, and (iii) an imaging plane of the second camera 121. The imaging plane of the second camera 121 represents the parallax D. As illustrated in FIG. 17, the first triangle Tr1 and the second triangle Tr2 are in a similar relationship. Therefore, based on the similar relationship, the control unit 60*a* can calculate a distance Z by using an equation of inter-camera distance B×focal length F/parallax D.

The inter-camera distance B indicates a distance between the first position Po1 and the second position Pot. The inter-camera distance B is a movement distance of the second camera 121, and is set in advance. The focal length F is a focal length of the lens included in the second camera 121, and is a characteristic value of the adopted second camera 121. Therefore, the control unit 60*a* calculates the parallax D as described above, and substitutes the parallax D into the above-described equation. In this manner, the control unit 60*a* can calculate the distance Z to the object (for example, the drug MDA) from the focal position of the lens included in the second camera 121.

As described above, the control unit 60*a* calculates the distance Z by moving the second camera 121 in a horizontal direction and imaging the drug from two locations. In this manner, based on the distance Z, the drug sorting device 1 can adjust the lowering speed of the suction mechanism for each drug accommodated in the sorting cup 141 before the drug is suctioned. Therefore, it is possible to reduce a possibility that the fetching speed of the drug from the sorting cup 141 may be reduced. In addition, the suction mechanism can properly suction the drug accommodated in the sorting cup 141.

In addition, the control unit 60*a* can calculate the distance Z for each drug accommodated in the sorting cup 141. Therefore, the suction mechanism can sequentially suction the drugs from the upper side drug. Therefore, the suction mechanism fetches the lower side drug first. In this manner, it is possible to reduce a possibility that the upper side drug may be flown out from the sorting cup 141.

In this way, the control unit 60*a* can reduce the above-described possibility as follows. Only the distance Z is calculated by capturing two images of the drug accommodated in the sorting cup 141 without changing any mechanism in the drug sorting device 1. That is, the drug sorting device 1 can calculate the distance Z without providing a distance measuring sensor or a stereo camera, for example. Therefore, in order to reduce the above-described possibility, the drug sorting device 1 can calculate the distance Z without incurring costs for attaching the distance measuring sensor. In addition, the drug sorting device 1 can calculate the distance Z by using a space-saving and simple method.

In the present embodiment, a case of fetching the drugs from the sorting cup 141 has been described as an example. However, even when the drugs are fetched from the first accommodation unit 11, the drug sorting device 1 can fetch the drugs by using the above-described method for calculating the distance Z. In addition, the method for fetching the drugs by using the above-described method for calculating the distance Z can also be realized by the drug sorting device 1A. Furthermore, the method for fetching the drugs is applicable not only to the drug sorting device but also to a picking system for fetching an object from a horizontal plane (XY-stage).

[Realization Example Using Software]

A control block (particularly, the control units 60*a* and 60Aa) of the drug sorting devices 1 and 1A may be realized by a logic circuit (hardware) formed in an integrated circuit (IC chips), or may be realized by software.

In the latter case, the drug sorting devices 1 and 1A include a computer that executes a command of a program (type discrimination program) which is software for realizing each function. For example, this computer includes one or more processors, and includes a computer-readable recording medium for storing the above-described program. In the above-described computer, the processor reads the above-described program from the above-described recording medium, and executes the program. In this manner, an object of the present invention can be achieved. As the above-described processor, for example, a central processing unit (CPU) can be used. As the recording medium, for example, a "non-temporary tangible medium" such as a read only memory (ROM), a tape, a disk, a card, a semiconductor memory, or a programmable logic circuit can be used. In addition, a random access memory (RAM) for developing the above-described program may be further provided. In addition, the above-described program may be supplied to the above-described computer via any transmission medium (communication network or broadcast wave) capable of transmitting the program. One aspect of the present invention can also be realized in a form of a data signal embedded in a carrier wave, in which the above-described program is embodied by electronic transmission.

[Function to Facilitate Organization of Packaged Items]

The drug sorting devices 1 and 1A have the packaging mechanism 6, and the sorted drugs are sequentially conveyed to the packaging mechanism 6, and are sorted by each of the sorting cups 141 accommodating the drugs of the same type. At this time, the amount of the accommodated drugs per one package is determined, and a large amount of the drugs accommodated in the sorting cup 141 is divided into a plurality of packages to perform packaging processing. The packaging processing is automatically performed, and packaged package bags are discharged from the drug sorting device 1 and 1A in the form of strips after a predetermined number of the packaged bags form a belt shape. The discharged package belt is accommodated in an accommodation box (not illustrated) provided outside the device. Therefore, an operator needs to fetch and confirm the package belt to check which drug is present at any position of the package belt. Accordingly, it takes time and effort.

In particular, after the drugs are sorted by the drug sorting devices 1 and 1A, the drugs for each drug type packaged by the packaging mechanism 6 need to return to a tablet packaging machine or a tablet accommodation shelf separate from the drug sorting devices 1 and 1A. Therefore, it is necessary to fetch the package bag packaged without omission for each drug of the same type. However, the package belts dispensed by the packaging mechanism 6 are in a stacked state in the accommodation box. Therefore, the operator needs to manually pick up and visually confirm all of the bags, thereby causing a problem in that the operator has to individually search for and remove a target drug bag. In addition, in some cases, the package bags of the same drug type may not exist in the same package belt. When another group of the package belt is not searched for, it is not possible to finally confirm all of the package bags without omission. Consequently, the work is complicated.

Therefore, when the packaging operation is completed, the display unit 32 of the touch panel 3 displays information indicating that "packaging is completed" and a button indicating that "confirm a packaging result". The operator touches or clicks the button. In this manner, the display unit 32 of the touch panel 3 can display the number of the package bags packaged in the current packaging operation for each drug. In addition, as the information related to the packaging result displayed on the display unit 32, the same information may be printed on a printed matter such as a journal which can be carried when searching work is carried out from a storage location of actual package bags.

Specifically, a drug name and the number of the packaged package bags are displayed on the same line or printed on a printed matter. Similarly, with regard to the other drugs, a drug name and the number of the packaged package bags are displayed or printed on a printed matter for each drug. In this manner, the operator can recognize the number of the package bags for each drug after packaging is completed. Therefore, even during the work for fetching the package bag of the target drug from a group of the actually stored package belts, the operator only needs to search for the number of the displayed or printed package bags. Therefore, there is no need to worry about a searching failure. When the number of the displayed package bags can be fetched, the operator can shift to the work for fetching the package bag of the subsequent drug. Compared to the related art, it is possible to shorten the work for fetching all of the package bags from the accommodation box.

[Additional Notes]

The present invention is not limited to each of the above-described embodiments, and can be modified in various ways within the scope of the claims. Embodiments obtained by appropriately combining technical means respectively disclosed in different embodiments are also included in the technical scope of the present invention.

The invention claimed is:

1. A type discrimination device comprising:

an image generation unit that generates an extraction mark image in which a mark appearing on a captured image of a target drug whose type is unidentified is extracted, based on an output image obtained by inputting the captured image to a trained semantic segmentation model trained to distinguish between pixels forming the mark on the drug in the captured image and pixels forming a background portion of the captured image; and a discrimination unit that discriminates the type of the target drug, based on a collation result between the extraction mark image generated by the image generation unit and a registration mark image registered in advance for each type of drug;

wherein the trained model is trained to calculate, for each pixel forming the captured image, a probability value indicating a probability that the pixel forms the mark; and wherein each pixel of the extraction mark image has a binary value representing a classification of the pixel as one of the mark or the background region of the mark based on the probability value of the pixel.

2. The type discrimination device according to claim 1, wherein the mark is an engraved mark or a secant line.

3. The type discrimination device according to claim 1, wherein the discrimination unit discriminates the type of the target drug, based on a collation result between an image obtained by performing blurring processing on the extraction mark image and the registration mark image.

4. The type discrimination device according to claim 1, wherein the trained model has an encoder-decoder structure to generate the output image having a common size with the input captured image.

5. The type discrimination device according to claim 1, wherein the discrimination unit discriminates the type of the target drug without using the trained model.

6. The type discrimination device according to claim 5, wherein between the generation of the extracted mark image by the image generation unit and the discrimination of the type of the target drug by the discrimination unit, no processing using the trained model is performed.

7. A type discrimination method performed by a type discrimination device, the method comprising:

an image generation step of generating an extraction mark image in which a mark appearing on a captured image of a target drug whose type is unidentified is extracted, based on an output image obtained by inputting the captured image to a trained semantic segmentation model trained to distinguish between pixels forming the mark on the drug in the captured image and pixels forming a background portion of the captured image;

a discrimination step of discriminating the type of the target drug without using the trained model, based on a collation result between the extraction mark image generated in the image generation step and a registration mark image registered in advance for each type of drug in a drug database that manages drug data relating to a plurality of types of drugs;

wherein between the image generation step of generating the extracted mark image and the discrimination step of discriminating the type of the target drug, no processing using the trained model is performed;

wherein the trained model is trained to calculate, for each pixel forming the captured image, a probability value indicating a probability that the pixel forms the mark; and wherein each pixel of the extraction mark image has a binary value representing a classification of the pixel as one of the mark or the background region of the mark based on the probability value of the pixel.

8. A non-transitory computer-readable medium having recorded thereon a type discrimination program that causes a computer to execute:

an image generation step of generating an extraction mark image in which a mark appearing on a captured image of a target drug whose type is unidentified is extracted, based on an output image obtained by inputting the captured image to a trained semantic segmentation model trained to distinguish between pixels forming the mark on the drug in the captured image and pixels forming a background portion of the captured image;

a discrimination step of discriminating the type of the target drug without using the trained model, based on a collation result between the extraction mark image generated in the image generation step and a registration mark image registered in advance for each type of drug in a drug database that manages drug data relating to a plurality of types of drugs;

wherein between the image generation step of generating the extracted mark image and the discrimination step of discriminating the type of the target drug, no processing using the trained model is performed;

wherein the trained model is trained to calculate, for each pixel forming the captured image, a probability value indicating a probability that the pixel forms the mark; and wherein each pixel of the extraction mark image has a binary value representing a classification of the pixel as one of the mark or the background region of the mark based on the probability value of the pixel.

* * * * *